(12) United States Patent
Miyata et al.

(10) Patent No.: US 7,859,792 B2
(45) Date of Patent: Dec. 28, 2010

(54) MAGNETIC HEAD WITH A RECORDING ELEMENT INCLUDING A NON-MAGNETIC FILM AND A MAGNETIC POLE FILM OF AN ELECTRODE AND PLATED FILM FORMED IN A DEPRESSION OF THE MAGNETIC POLE FILM

(75) Inventors: Shingo Miyata, Tokyo (JP); Atsushi Yamaguchi, Tokyo (JP); Masashi Sano, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 816 days.

(21) Appl. No.: 11/691,907

(22) Filed: Mar. 27, 2007

(65) Prior Publication Data

US 2008/0253024 A1 Oct. 16, 2008

(51) Int. Cl.
*G11B 5/127* (2006.01)

(52) U.S. Cl. ............... 360/125.12; 360/125.5; 360/125.63; 360/125.26

(58) Field of Classification Search ............ 360/125.12, 360/125.24, 125.26, 125.28, 125.39, 125.45, 360/125.5, 125.58, 125.63, 125.69, 125.73
See application file for complete search history.

(56) References Cited

U.S. PATENT DOCUMENTS

| | | | | |
|---|---|---|---|---|
| 6,301,077 | B1 * | 10/2001 | Sasaki ................... | 360/125.56 |
| 7,468,864 | B2 * | 12/2008 | Sasaki et al. .......... | 360/125.12 |
| 7,522,377 | B1 * | 4/2009 | Jiang et al. ............. | 360/125.12 |
| 7,558,020 | B2 * | 7/2009 | Sasaki et al. .......... | 360/125.14 |
| 2007/0195457 | A1 | 8/2007 | Matono et al. | |
| 2007/0211391 | A1 | 9/2007 | Hirata et al. | |

FOREIGN PATENT DOCUMENTS

| | | |
|---|---|---|
| JP | 63-70925 | 3/1988 |
| JP | 11-288900 | 10/1999 |
| JP | 2001-323393 | 11/2001 |
| JP | 2002-92821 | 3/2002 |
| JP | 2003-17474 | 1/2003 |
| JP | 2004-335068 | 11/2004 |
| JP | 3627916 | 12/2004 |
| JP | 2006-92721 | 4/2006 |
| JP | 2007-242786 | 9/2007 |
| JP | 2007-257815 | 10/2007 |

OTHER PUBLICATIONS

U.S. Appl. No. 11/733,469, filed Apr. 10, 2007, Yamaguchi, et al.
U.S. Appl. No. 11/763,057, filed Jun. 14, 2007, Yamaguchi, et al.

* cited by examiner

*Primary Examiner*—A. J. Heinz
(74) *Attorney, Agent, or Firm*—Oblon, Spivak, McClelland, Maier & Neustadt, L.L.P.

(57) ABSTRACT

A recording element supported by a slider includes a non-magnetic film and a magnetic pole film. The non-magnetic film has a depression whose inner surface is provided with an amorphous electrode film used as a plating seed film. Above the electrode film, the magnetic pole film is grown by plating. The magnetic pole film may be either an electroplated film grown on the electrode film to have a maximum crystal grain size of 20 nm or less or an electroless plated film. This decreases coercive force of the magnetic pole film.

25 Claims, 16 Drawing Sheets

MAGNETIC HEAD WITH A RECORDING ELEMENT INCLUDING A NON-MAGNETIC FILM AND A MAGNETIC POLE FILM OF AN ELECTRODE AND PLATED FILM FORMED IN A DEPRESSION OF THE MAGNETIC POLE FILM

TECHNICAL FIELD

The present invention relates to a magnetic head, a head assembly, a magnetic recording apparatus, and a method for manufacturing the magnetic head.

BACKGROUND OF THE INVENTION

In the field of magnetic heads to be mounted on a magnetic recording apparatus such as a hard disk drive (HDD), recently, the recording method is being shifted from longitudinal recording to perpendicular recording in order to improve the recording density with respect to a magnetic recording medium such as a hard disk. The perpendicular recording method achieves high linear recording density and also has an advantage that the recording medium after recording becomes highly resistant to heat fluctuation.

A perpendicular recording magnetic head is provided with a coil film for generating a magnetic flux and a magnetic pole film for guiding the magnetic flux to a recording medium. In a HDD using this perpendicular magnetic head, the recording medium can be magnetized by a perpendicular magnetic field for recording.

In the production process of the perpendicular magnetic head, the end width (or trailing edge width) of the magnetic pole film, which defines a recording track width, has to be decreased as much as possible in order to meet an increase in surface recording density. As means for decreasing the trailing edge width, for example, Japanese Unexamined Patent Application Publication No. 2001-323393 discloses a method of forming a resist pattern to have an opening, then narrowing the opening by forming an insoluble film to cover the resist pattern, and then forming a plated film in the opening formed with the insoluble film.

Japanese Unexamined Patent Application Publication No. 2003-017474 also discloses a thin-film patterning method of forming a strippable film and a resist pattern with an opening on a thin film in the mentioned order, subsequently narrowing the opening by forming an additional film to cover the resist pattern, and then etching the thin film using the resist pattern and the additional film as a mask.

As a method for forming a magnetic pole film, Japanese Unexamined Patent Application Publication No. 2002-092821 discloses a method of forming a depression in an inorganic insulating film by etching the inorganic insulating film using a resist pattern as a mask, then removing the resist pattern, then forming a stopper film and a magnetic film in the mentioned order to cover the inorganic insulating film, and then polishing the magnetic film until the stopper film is exposed. In this method, a main magnetic pole film having an inverted trapezoid cross-section can be formed in the depression after polishing.

In manufacturing fields related to today's thin-film devices, moreover, ALD (atomic layer deposition) is adopted as a film formation method which is extremely excellent in controlling the film thickness (for example, "ALD atomic layer deposition apparatus" by Techscience Ltd., Internet <URL: http://techsc.co.jp/products/mems/ALD.htm>). This ALD is a method capable of forming an ultrathin, dense oxide, nitride or metal film under a high temperature equal to or greater than 150 degrees centigrade and adopted in manufacturing fields where physical properties such as withstand voltage are strictly demanded.

In the magnetic head manufacturing field, ALD is used in the formation process of a reproducing gap of a reproducing head (for example, the specification of U.S. Pat. No. 6,759,081).

In order to improve the recording capacity of a hard disk drive (HDD), meanwhile, the recording resolution must be improved by increasing the coercive force of the medium while increasing the track density by reducing the magnetic pole film width of the magnetic head. In order to assure sufficient overwrite characteristics with respect to a medium of a high coercive force, a high saturation magnetic flux density material such as an FeCo-type material, a CoNiFe ternary alloy film, FeC or FeN has to be used for the magnetic pole film.

Also in perpendicular magnetic heads, the recording capacity can be improved by using such a high saturation magnetic flux density material for the magnetic pole film.

However, the perpendicular magnetic heads have a problem that a signal recorded by the magnetic pole film on the magnetic recording medium becomes erased when recording is not performed, and this problem is called "pole erase".

In the perpendicular magnetic heads, a soft magnetic film for recording has its hard axis directed along an ABS direction to perform recording in magnetization rotation mode. That is, residual magnetization along the ABS direction is minimized to prevent an excess magnetic flux from being generated when recording is not performed, thereby avoiding the pole erase. In order to assure this function, the coercive force of the magnetic pole film has to be kept low.

However, if there is taken a manufacturing method in which the magnetic pole film is formed by a plated film, the crystal grain size in the plated film growing on a seed film (or electrode film) tends to increase with distance from the seed film as the film growth progresses. The coercive force Hc increases with increase in the crystal grain size. Therefore, the demand for low coercive force on the magnetic pole film cannot be met.

Particularly in the perpendicular magnetic heads, since the write magnetic pole has its write end at the trailing edge remote from the seed film, there is a particular problem that the crystal grain size increases at the very end important for writing, which leads to increase in the coercive force, and therefore, it is greatly desired to solve the problem of increase in the coercive force due to increase in the crystal grain size.

SUMMARY OF THE INVENTION

It is an object of the present invention to provide a magnetic head, particularly a perpendicular magnetic head with a magnetic pole film having a low coercive force.

It is another object of the present invention to provide a magnetic head, particularly a perpendicular magnetic head which can avoid the problem of pole erase as much as possible.

It is still another object of the present invention to provide a head assembly and a magnetic recording/reproducing apparatus using the foregoing magnetic head, particularly the perpendicular magnetic head.

It is yet another object of the present invention to provide a manufacturing method suitable for manufacturing the foregoing magnetic head, particularly the perpendicular magnetic head.

In order to achieve the above-mentioned objects, a magnetic head according to a first aspect of the present invention has an amorphous electrode film on an inner surface of a depression provided in a non-magnetic film. A magnetic pole film is a plated film grown on the electrode film.

The electrode film is intended to function as a so-called seed film for growing the plated film. If the electrode film intended to function as a seed film is amorphous, the plated film growing thereon can avoid the problem of increase in the crystal grain size due to inheriting the crystal structure of the seed film, which provides a magnetic pole film with a small crystal grain size. Therefore, there can be obtained a magnetic head, particularly a perpendicular magnetic head whose magnetic pole film has a low coercive force.

In addition, since the magnetic pole film is grown by plating on the electrode film disposed on the inner surface of the depression, the plated film grows toward the center of the depression from both side walls thereof. Hence, the depression can be filled with the plated film at a relatively early stage of the plate growth, which results in formation of a small grain size plated film inside the depression, as desired in the present invention.

The amorphous electrode film may be formed by a sputtered film or an electroless plated film. There have been known the technique of obtaining an amorphous electroless plated film by electroless plating. The electrode film may be made of the same material as or a different material from the magnetic pole film.

According to another aspect, the plated film disposed on the electrode film adhered to the inner surface of the depression has a maximum crystal grain size of 25 nm or less, particularly preferably 20 nm or less. In this case, the electrode film is not necessarily required to be an amorphous film but may be a crystalline film. However, the largest crystal of the electrode film should be as small as possible. Preferably, the maximum crystal grain size of the electrode film is equal to or less than 20 nm.

According to still another aspect, the magnetic pole film is an electroless plated film filled in the depression provided in the non-magnetic film. The electroless plated film, which enables reduction of the crystal grain size and can easily be made amorphous, can avoid the problem of increase in the coercive force due to increase in the crystal grain size and ensuing pole erase.

Inside the depression, moreover, since the electroless plated film grows toward the center of the depression from both side walls thereof, a small grain size plated film can be formed inside the depression, as desired in the present invention.

A typical example of the magnetic head according to the present invention is a perpendicular magnetic head. Generally, the perpendicular magnetic head includes a slider and a perpendicular recording element. The perpendicular recording element includes a non-magnetic film and a magnetic pole film and is supported by the slider. The present invention is applicable to the perpendicular recording element. There can be obtained a perpendicular magnetic head which can avoid the pole erase as much as possible, even in combination with a magnetic recording medium which has a minute distance between adjacent tracks for high-density recording.

In the perpendicular magnetic head, generally, the perpendicular recording element includes a yoke, a coil film and a gap. The yoke constitutes a magnetic circuit in combination with the magnetic pole film. The coil film supplies a magnetic flux to the magnetic circuit. The gap is located on the air bearing surface side of the slider and interposed between the magnetic pole film and one end of the yoke to generate a leakage field. In the perpendicular magnetic head, the magnetic pole film and the yoke are arranged such that the leakage field has a large perpendicular component that is perpendicular to the air bearing surface, to thereby utilize the perpendicular component as a writing magnetic field.

Magnetic heads of this type are generally of the complex type including the above perpendicular recording element and a reproducing element. As the reproducing element, there may be employed a giant magneto-resistive effect element (GMR) or a ferromagnetic tunnel junction element (TMR).

The present invention also discloses a head assembly and a magnetic recording/reproducing apparatus. The head assembly includes the above magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (or gimbal) and an HAA (head arm assembly) in which the HGA is mounted on an arm.

The magnetic recording/reproducing apparatus according to the present invention includes the above head assembly and a magnetic recording medium. A typical example of the magnetic recording/reproducing apparatus is a hard disk drive (HDD) using a magnetic recording medium called "hard disk".

The present invention also discloses a plurality of manufacturing methods with respect to the above magnetic head. In a first manufacturing method, at first, a resist pattern is formed on a substrate to have a depression, and then an inner wall of the resist pattern inside the depression and a surface of the resist pattern in which the depression opens are covered with an amorphous electrode film. Then, after a magnetic film is grown on the electrode film by electroplating to fill at least the depression, the electrode film, the magnetic film and the resist pattern are removed until at least the resist pattern is exposed. Subsequently, the resist pattern is removed from above the substrate while leaving the electrode film and the magnetic film, and then the electrode film and the magnetic film on the substrate is enclosed with a non-magnetic film.

In another manufacturing method, a non-magnetic film is formed on a substrate to have a depression, and then an inner wall of the non-magnetic film inside the depression and a surface of the non-magnetic film in which the depression opens are covered with an amorphous electrode film. Then, after a magnetic film is grown on the electrode film by electroplating to fill at least the depression, the electrode film, the magnetic film and the non-magnetic film are removed until at least the non-magnetic film is exposed.

In still another manufacturing method, a resist pattern is formed on a substrate to have a depression, and then a magnetic film is grown by electroless plating on an inner wall of the resist pattern inside the depression and a surface of the resist pattern in which the depression opens. Subsequently, the magnetic film and the resist pattern are removed until at least the resist pattern is exposed, and then the resist pattern is removed while leaving the magnetic film. Thereafter, the magnetic film is enclosed with a non-magnetic film.

In yet another manufacturing method, a non-magnetic film is formed on a substrate to have a depression, and then a magnetic film is grown by electroless plating on an inner wall of the non-magnetic film inside the depression and a surface of the non-magnetic film in which the depression opens, and then the magnetic film and the non-magnetic film are removed until at least the non-magnetic film is exposed.

In any one of the manufacturing methods, preferably, a non-magnetic film is formed on an inner surface of the depression by ALD (atomic layer deposition), followed by forming the electrode film or the magnetic film thereon.

The other objects, constructions and advantages of the present invention will be further detailed below with reference to the attached drawings. However, the attached drawings show only illustrative examples.

DESCRIPTION OF THE PREFERRED EMBODIMENTS

1. Magnetic Head

Figure 1:
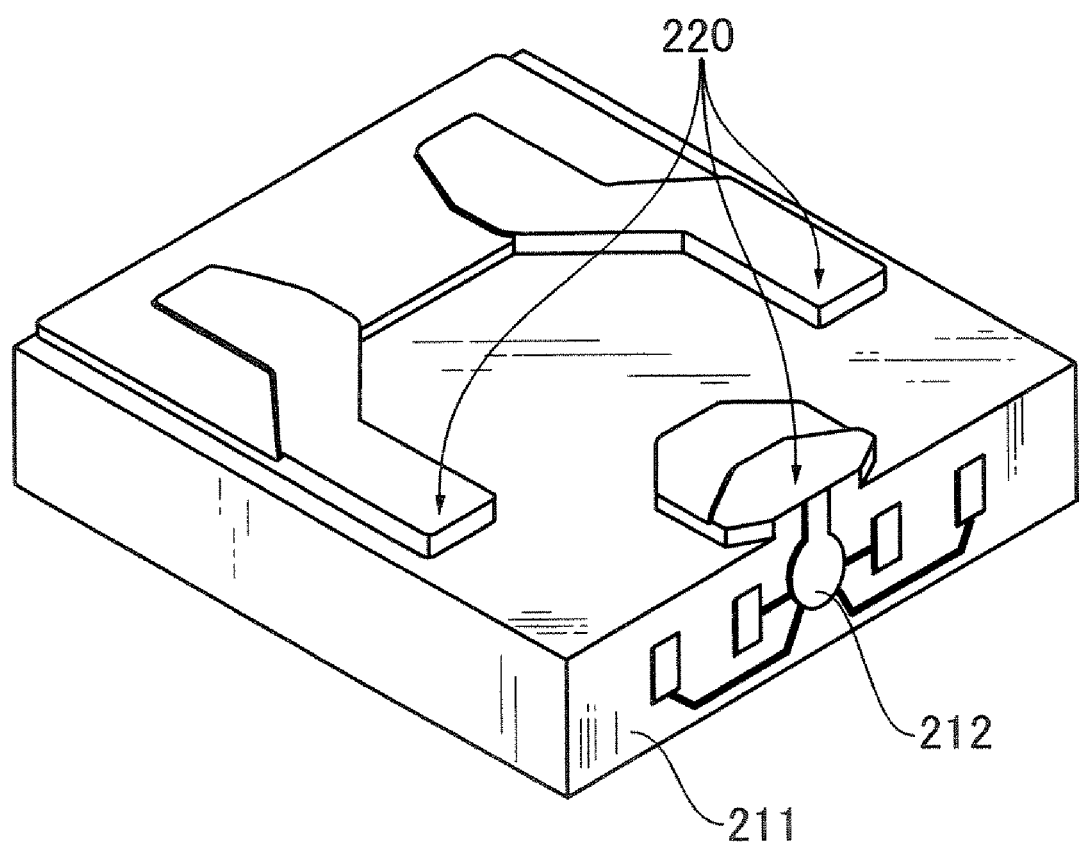
FIG. 1 is a perspective view of a magnetic head according to the present invention.
Figure 2:
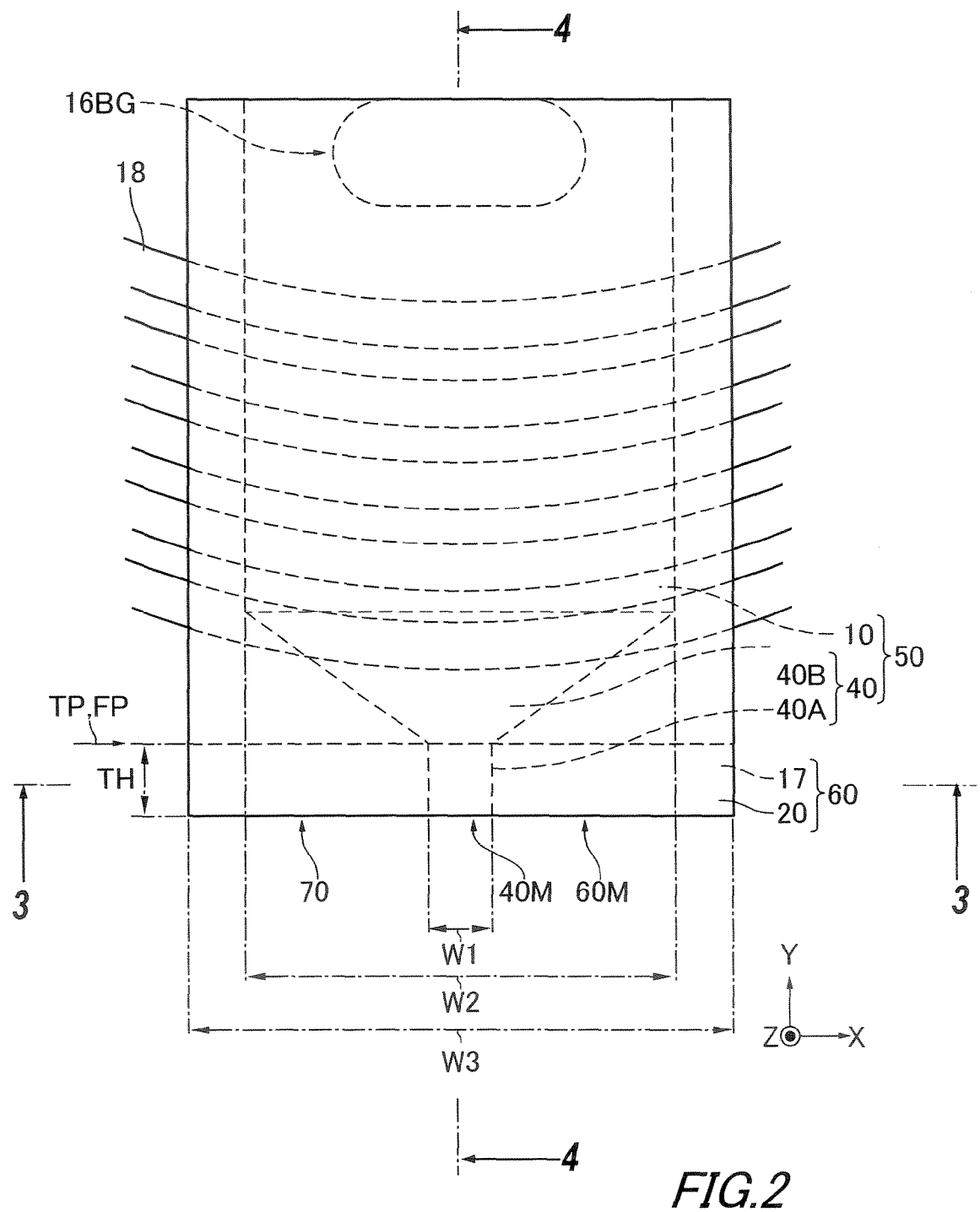
FIG. 2 is a plan view schematically showing a part of a perpendicular recording element contained in a magnetic head according to the present invention.
Figure 3:
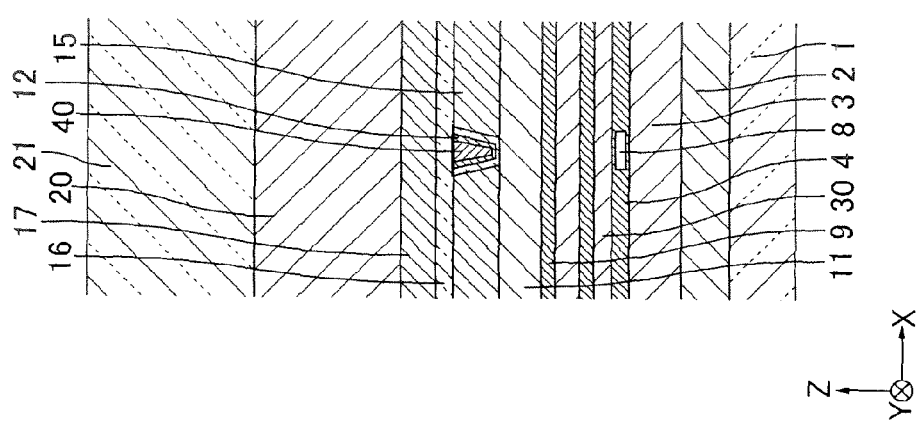
FIG. 3 is a sectional view taken along line 3-3 in FIG. 2.

FIGS. 1 to 3 show a magnetic head to be used in combination with a rapidly spinning magnetic recording medium such as a hard disk. Magnetic heads of this type are generally called "floating-type". However, the magnetic head according to the present invention is not necessarily required to be of the floating-type. For example, it may be a magnetic head which comes into contact with a magnetic recording medium.

In the magnetic head, referring first to FIG. 1, a thin-film element 212 for performing both recording and reproducing processes is attached to one face of a substrate 211 made of, for example, a non-magnetic insulating material such as AlTiC to have a generally rectangular prism structure. The substrate 211 has an air bearing surface 220 directly related to the floating characteristics, and the thin-film element 212 is attached to another face perpendicular to the air bearing surface 220.

Figure 4:
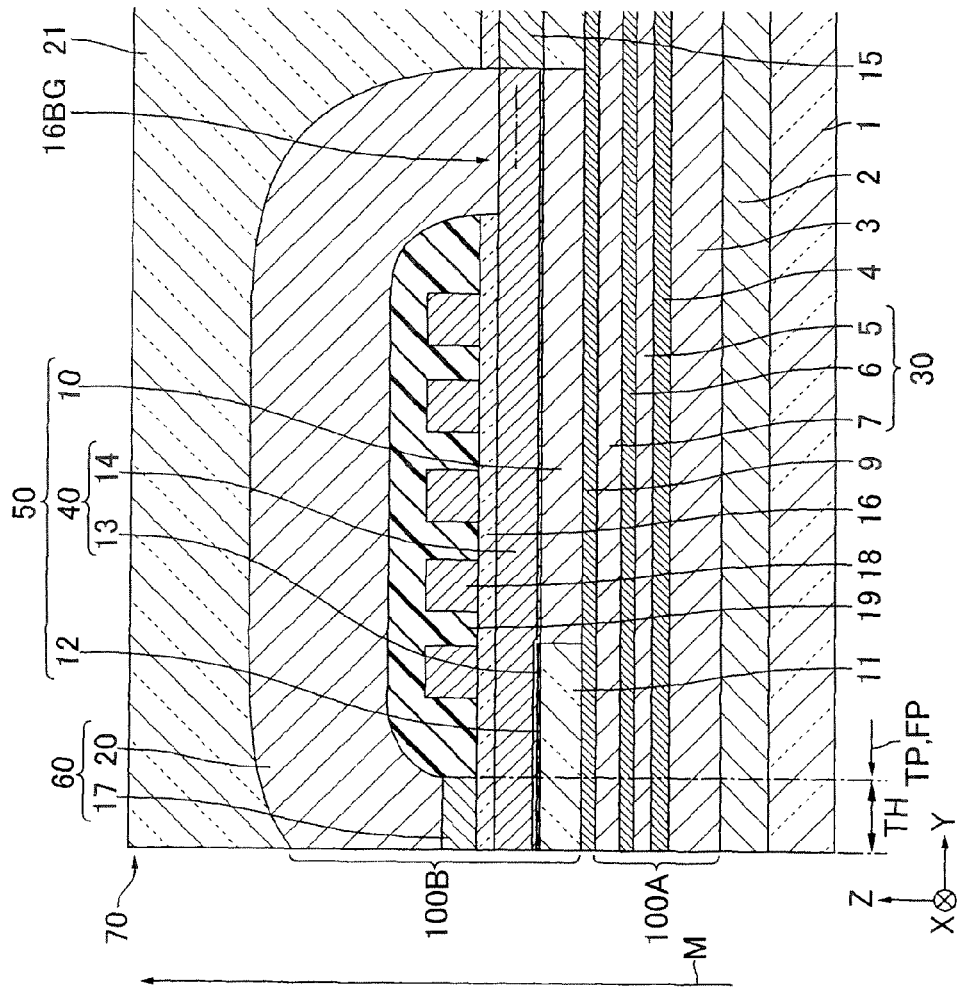
FIG. 4 is a sectional view taken along line 4-4 in FIG. 2.

Details of the thin-film element 212 are shown in FIGS. 2 to 4. In FIGS. 2 to 4, dimensions along X, Y and Z axes are called "width", "length" and "thickness/height", respectively. Along the Y axis, moreover, one side close to an air bearing surface 70 and the other side remote therefrom are designated by "front" and "rear", respectively, and being positioned forward and being positioned rearward are expressed by "project" and "recede", respectively.

The magnetic head shown in FIGS. 2 to 4 is a complex-type head which can perform both recording and reproducing. In the magnetic head, an insulating film 2, a reproducing head portion 100A using magneto-resistive effect (MR effect), a separating film 9, a recording head portion 100B for performing a recording process in a perpendicular recording method, and an overcoat film 21 are layered on a substrate 1 in the mentioned order.

The substrate 1 is made of, for example, a ceramic material such as AlTiC ($Al_2O_3 \cdot TiC$), while the insulating film 2, the separating film 9 and the overcoat film 21 are made of, for example, a non-magnetic insulating material such as aluminium oxide ($Al_2O_3$: hereinafter merely referred to as "alumina").

The reproducing head portion 100A is formed, for example, by layering a lower read shield film 3, a shield gap film 4, and an upper read shield film 30 in the mentioned order. In the shield gap film 4, a reproducing element (or MR element 8) is embedded in such a manner as to be exposed on the air bearing surface 70. The air bearing surface 70 is uniquely defined with reference to one end face of the substrate 1 supporting a series of components from the insulating film 2 to the overcoat film 21, more specifically, refers to a surface containing one end face of the substrate 1.

Both the lower read shield film 3 and the upper read shield film 30 function to magnetically separate the MR element 8 from the surroundings and extend rearward from the air bearing surface 70. The lower read shield film 3 is made of, for example, a magnetic material such as a nickel-iron alloy (NiFe). In this case, the nickel-iron alloy (NiFe) may have a composition ratio of 80 wt. % of Ni and 20 wt. % of Fe. The upper read shield film 30 is formed, for example, by layering two upper read shield film portions 5, 7 with a non-magnetic film 6 interposed therebetween. Both the upper read shield film portions 5, 7 are made of, for example, a magnetic material such as a nickel-iron alloy. The non-magnetic film 6 is made of, for example, a non-magnetic material such as ruthenium (Ru) or alumina. The upper read shield film 30 is not necessarily required to have a layered structure but may have a single film structure of a magnetic material.

The shield gap film 4 functions to electrically separate the MR element 8 from the surroundings and is made of, for example, a non-magnetic insulating material such as alumina. The MR element 8 uses giant magneto-resistive effect (GMR) or tunneling magneto-resistive effect (TMR), for example.

The recording head portion 100B is a so-called shield-type perpendicular recording element including a non-magnetic film 11, a first non-magnetic film 15, a magnetic pole film 50 filled in a depression 151 provided in the first non-magnetic film 15, a gap film 16 with an opening (or back gap 16BG) for magnetic connection, a coil film 18 embedded in an insulating film 19, and a magnetic film 60.

The magnetic pole film 50 extends rearward from the air bearing surface 70. The magnetic pole film 50 includes an auxiliary magnetic pole film 10, a second non-magnetic film 12, and a main magnetic pole film 40.

The auxiliary magnetic pole film 10 extends from behind the air bearing surface 70 to the back gap 16BG. For example, the auxiliary magnetic pole film 10 is disposed on the leading side with respect to the main magnetic pole film 40 and has a rectangular plan shape (width W2), as shown in FIG. 2. The non-magnetic film 11 functions to electrically and magnetically separate the auxiliary magnetic pole film 10 from the surroundings and is made of, for example, a non-magnetic insulating material such as alumina.

The second non-magnetic film 12 is adhered to an inner surface of the depression 151 enclosed by the first non-magnetic film 15. For example, the second non-magnetic film 12 extends from the air bearing surface 70 to the forefront position of the auxiliary magnetic pole film 10 for connecting the auxiliary magnetic pole film 10 and the main magnetic pole film 40 and is made of a non-magnetic insulating material such as alumina or aluminium nitride. However, the extent of the second non-magnetic film 12 may be set arbitrarily.

The sectional shape of the second non-magnetic film 12 parallel to the air bearing surface 70 is U-shaped, as shown in FIG. 3, and the main magnetic pole film 40 (front end portion 40A described below) is embedded inside the second non-magnetic film 12. The second non-magnetic film 12 is formed, for example, by ALD to have a uniform thickness around the main magnetic pole film 40 (along its bottom face and both side faces).

The first non-magnetic film 15 functions to electrically and magnetically separate the main magnetic pole film 40 from the surroundings. The first non-magnetic film 15 is embedded outside the second non-magnetic film 12 and is made of, for example, a non-magnetic insulating material such as alumina.

The first and second non-magnetic films 15, 12 are each made of a non-magnetic insulating material but have different compositions because of their different formation methods. More specifically, the first non-magnetic film 15 is formed such as by sputtering using an inert gas and contains the inert gas because of its formation method. It should be noted that examples of the inert gas include argon (Ar), krypton (Kr) and xenon (Xe). On the other hand, the second non-magnetic film 12 is formed such as by ALD not using any inert gas and contains no inert gas because of its formation method. Whether the first and second non-magnetic films 15, 12 contain any inert gas or not can be determined by using a composition analysis method such as scanning transmission electron microscopy (STEM)—energy-dispersive X-ray spectroscopy (EDS).

The first and second non-magnetic films 15, 12 are also different in the content of specific components because of their different formation methods. More specifically, since water and trimethyl aluminium (TMA) are used in ALD but not used in sputtering, the content of hydrogen (H) is larger in the second non-magnetic film 12 than in the first non-magnetic film 15.

The main magnetic pole film 40 extends from the air bearing surface 70 to the back gap 16BG. The main magnetic pole film 40 includes, for example, the front end portion 40A extending rearward from the air bearing surface 70 and a rear end portion 40B connected to the rear end of the front end portion 40A, as shown in FIG. 2. The front end portion 40A is a substantial magnetic flux emitting portion (so-called magnetic pole film) and has a constant width W1 which defines the recording track width. The rear end portion 40B is a portion intended to supply a magnetic flux to the front end portion 40A and has a width W2 larger than the width W1. The width of the rear end portion 40B is, for example, constant (width W2) at its rear portion and decreases in its front portion toward the front end portion 40A. The position where the width of the main magnetic pole film 40 starts to increase from W1 to W2 is a so-called flare point FP.

Figure 5:
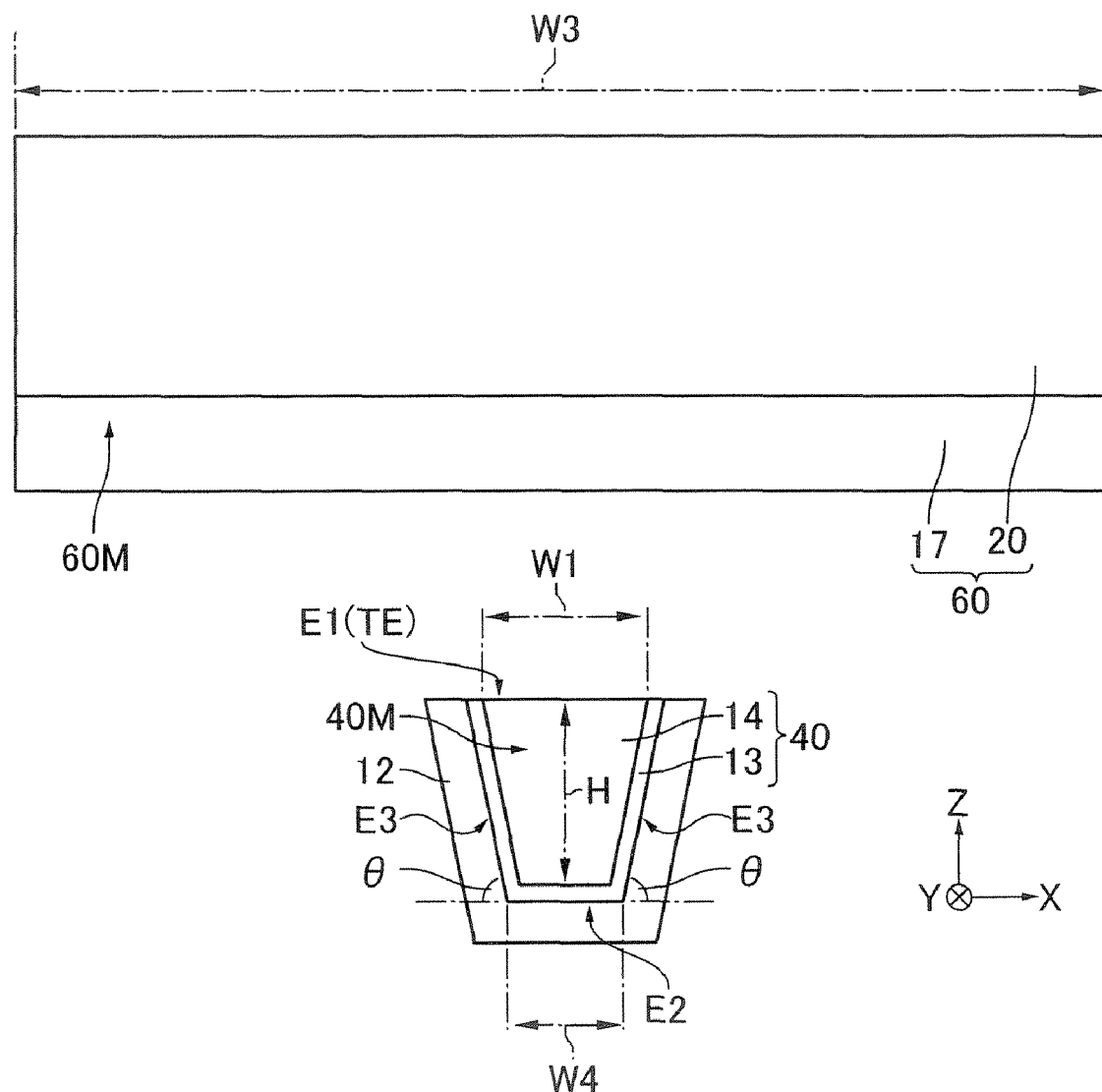
FIG. 5 is an end view showing a magnetic pole structure of the perpendicular recording element of the magnetic head shown in FIGS. 1 to 4.

An end face 40M of the main magnetic pole film 40 on the side close to the air bearing surface 70 is of, for example, an inverted trapezoid shape (height H), whose upper bottom and lower bottom are the longer side on the trailing side and the shorter side on the leading side, respectively, as shown in FIG. 5. Concretely, the end face 40M has a shape defined by an upper end edge E1 (width W1) on the trailing side, a lower end edge E2 (width W4) on the leading side, and two side edges E3, wherein the width W4 is smaller than the width W1. The upper end edge E1 is a substantial recording portion of the magnetic pole film 50, and its width W1 is approximately 0.2 µm or less. The bevel angle θ of the end face 40M (or angle between a direction along which the lower end edge E2 extends and the side edge E3) may be set arbitrarily, for example, within the range of less than 90 degrees.

The main magnetic pole film 40 includes an electrode film 13 and a plated film 14. The electrode film 13 is used to grow the plated film 14 in the production process of the magnetic head and is made of, for example, a magnetic material similar to that of the plated film 14. The plated film 14 is made of, for example, a high saturation magnetic flux density material such as an iron-nickel alloy (FeNi) or an iron-based alloy. Examples of the iron-based alloy include an iron-cobalt alloy (FeCo) and an iron-cobalt-nickel alloy (FeCoNi).

The gap film 16 is a gap for magnetically separating the magnetic pole film 50 and the magnetic film 60 and is made of, for example, a non-magnetic insulating material such as alumina or a non-magnetic conductive material such as ruthenium. The thickness of the gap film 16 is approximately 0.03 to 0.1 µm.

The coil film 18 functions to generate a magnetic flux and is made of, for example, a highly conductive material such as copper (Cu). The coil film 18 is wound around the back gap 16BG to have a winding structure (or spiral structure), as shown in FIG. 2.

The insulating film 19 functions to electrically separate the coil film 18 from the surroundings and is made of, for example, a non-magnetic insulating material such as a photoresist or a spin on glass (SOG) which becomes liquid when heated. The forefront position of the insulating film 19 is a throat height zero position TP, and the distance between the throat height zero position TP and the air bearing surface 70 is a so-called "throat height TH". For example, FIG. 2 shows a state where the throat height zero position TP matches the flare point FP.

The magnetic film 60 functions to absorb a spreading component of a magnetic flux emitted from the magnetic pole film 50 so as to increase the gradient of the perpendicular magnetic field and also absorb a magnetic flux returning from the recording medium so as to circulate the magnetic flux between the recording head portion 100B and a recording medium 80. The magnetic film 60, which extends rearward from the air bearing surface 70 on the trailing side of the magnetic pole film 50, is separated from the magnetic pole film 50 by the gap film 16 at its front but connected to the magnetic pole film 50 through the back gap 16BG at its rear. On the side close to the air bearing surface 70, the magnetic film 60 has an end face 60M which is, for example, of a rectangular shape having a width W3 larger than the width W1, as shown in FIG. 2. The magnetic film 60 includes, for example, a write shield film 17 and a return yoke film 20 which are distinct from each other.

The write shield film 17 functions to mainly increase the gradient of the perpendicular magnetic field and is made of, for example, a high saturation magnetic flux density material such as an nickel-iron alloy or an iron-based alloy. Particularly by absorbing a spreading component of a magnetic flux emitted from the magnetic pole film 50, the write shield film 17 functions to: (1) increase the magnetic field gradient of the perpendicular magnetic field; (2) decrease the recording width; and (3) incorporate an oblique magnetic field component into the perpendicular magnetic field. However, the write shield film 17 may additionally function to circulate the magnetic flux like the return yoke film 20. The write shield film 17 is adjacent to the gap film 16 and extends rearward from the air bearing surface 70 to have its rear end adjacent to the insulating film 19. Thus, the write shield film 17 serves to define the forefront position (throat height zero position TP) of the insulating film 19.

The return yoke film 20 functions to circulate the magnetic flux and is made of, for example, a magnetic material similar to that of the write shield film 17. The return yoke film 20 extends from the air bearing surface 70, through above the insulating film 19, to the back gap 16BG on the trailing side of the write shield film 17 and is connected to the write shield film 17 at its front but to the magnetic pole film 50 at its rear through the back gap 16BG, as shown in FIG. 4.

The overcoat film 21 functions to protect the magnetic head and is made of, for example, a non-magnetic insulating material such as alumina.

Figure 6:
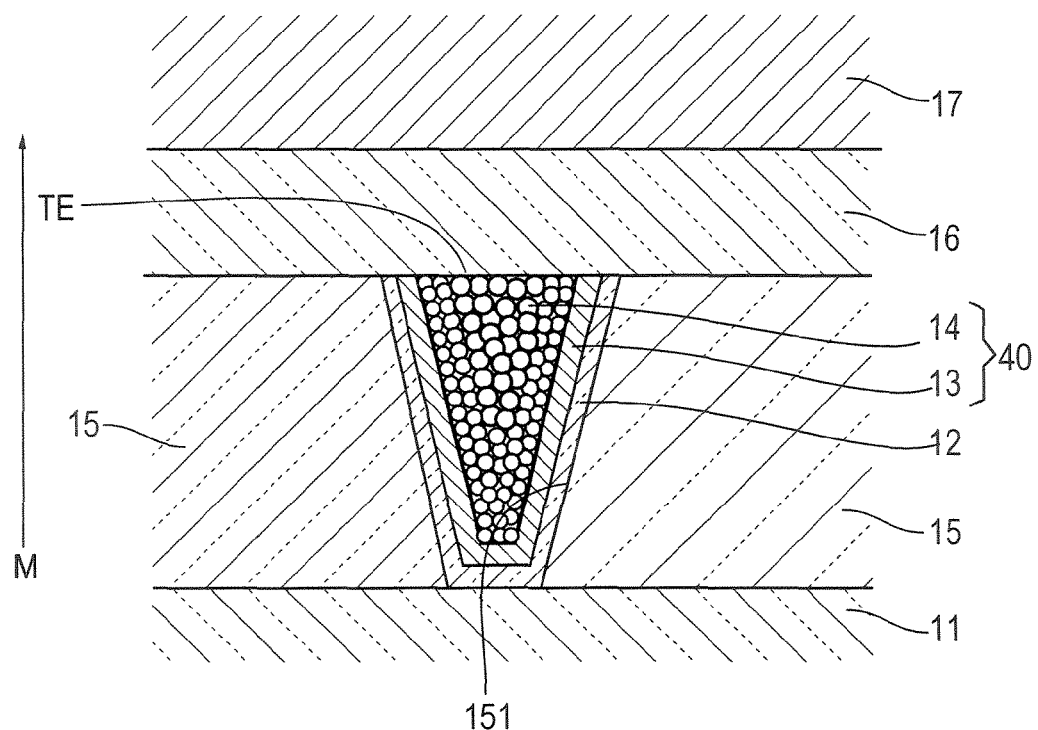
FIG. 6 is an enlarged sectional view at a magnetic pole portion.

Another feature of the present invention resides in that inside the depression 151 provided in the first non-magnetic film 15, as shown in FIG. 6 on an enlarged scale, the electrode film 13 adhered onto the first non-magnetic film 12 forming the inner surface thereof is an amorphous film and the plated film 14 forming most of the main magnetic pole film 40 is a plated film grown on the electrode film 13.

If the electrode film 13 intended to function as a seed film is amorphous, the plated film 14 growing thereon can avoid the problem of increase in the crystal grain size due to inheriting the crystal structure of the seed film, and therefore, the plated film 14 becomes a magnetic pole film with a small crystal grain size. Thus, there can be obtained a perpendicular magnetic head whose main magnetic pole film 40 has a low coercive force. Furthermore, since the crystal grain size is small even at the edge intended to serve as a trailing edge TE with respect to a moving direction M along which a recording medium relatively moves, it can also contribute to resolving the problem of increase in the coercive force due to increase in the crystal grain size.

In addition, since the plated film 14 forming most of the main magnetic pole film 40 is grown by plating on the electrode film 13 inside the depression 151, the plated film 14 grows toward the center of the depression 151 from both side walls thereof. Hence, the depression 151 can be filled with the plated film 14 at a relatively early stage of the plate growth, which results in formation of a small grain size plated film inside the depression 151, as desired in the present invention.

Particularly in the case of the depression 151 having a shape whose distance is small at its bottom side but large at the opposite side, i.e., an inverted trapezoid shape, the bottom side portion of the depression 151 can be filled with the plated film 14 at an extremely early stage of plating. In the plating film 14, the crystal grain size decreases toward the electrode film 13 intended to function as a seed film. Therefore, a magnetic head having a low coercive force can be obtained by making the most effective use of the plated film 14 in the bottom side portion.

having the structure shown in FIGS. 1 to 7 and varying in material and crystal grain size of the electrode film 13 and the plated film 14. The grain size was determined by TEM observation. The coercive force was measured by using an evaluation blanket wafer. In addition, the pole erase was measured by using an ordinary measuring means. In Samples S1 to S5, the electrode film 13 was an electroplated film, while in Sample S6, the electrode film 13 was an electroless plated film. In all Samples S1 to S6, the plated film 14 was an electroplated film.

TABLE 1

| | Electrode film 13 | | Plated film 14 | | Coercive | Pole erase experimental result | | | |
|---|---|---|---|---|---|---|---|---|---|
| | Material | Grain size (nm) | Material | Grain size (nm) | force (Oe) | Yield (%) | Rank A (%) | Rank B (%) | Rank C (%) |
| S1 | FeCo | >50 | FeCoNi | 40 | 14.1 | 20 | 3 | 18 | 79 |
| S2 | FeCoB | 26 | FeCoNi | 33 | 10.4 | 50 | 32 | 21 | 47 |
| S3 | FeCoB | 19 | FeCoNi | 25 | 7.5 | 100 | 59 | 41 | 0 |
| S4 | FeCoB | 14 | FeCoNi | 19 | 6.2 | 100 | 82 | 18 | 0 |
| S5 | FeCoB | amorphous | FeCoNi | 14 | 5.5 | 100 | 98 | 2 | 0 |
| S6 | FeCoB | amorphous | FeCoNi | 15 | 5.9 | 100 | 95 | 5 | 0 |

The plated film 14 of the main magnetic pole film 40 has a maximum crystal grain size in the range of 40 nm or less, preferably 25 nm or less, particularly preferably 20 nm or less. If the grain size is equal to or less than 20 nm, the coercive force can be decreased, for example, to 7.5 (Oe) or less, depending on the magnetic material. The plated film 14 of the main magnetic pole film preferably contains one of FeNi, FeCo and FeCoNi.

The amorphous electrode film 13 may be formed by a sputtered film or an electroless plated film. There have been known the technique of obtaining an amorphous electroless plated film by electroless plating. The electrode film 13 may be made of the same material as or a different material from the plated film 14. The electrode film 13 may contain, for example, one of FeCoB, FeCoNiB, NiP and NiB as a main component.

According to another aspect, the plated film 14 disposed on the electrode film 13 adhered to the inner surface of the depression 151 has a maximum crystal grain size of 25 nm or less, particularly preferably 20 nm or less. In this case, the electrode film 13 is not necessarily required to be an amorphous film but may be a crystalline film. However, the largest crystal of the electrode film 13 should be as small as possible. Preferably, the maximum crystal grain size of the electrode film 13 is equal to or less than 20 nm.

Table 1 shows the experimental results about the effect of the material and grain size of the electrode film (seed film) 13 and the plated film 14 on the coercive force and pole erase. In Table 1, the ranking: A, B, C shown in the pole erase experimental result are determined by ranking the resulting pole erases into three grades, wherein samples of least pole erase are ranked A, samples of pole erase considered as a defective product not meeting the actual requirements are ranked C, and intermediate samples considered as a non-defective product are ranked B. Samples S1 to S6 were magnetic heads Table 2 shows in detail the composition ratios of the electrode film 13 and the plated film 14 for respective Samples S1 to S6 in Table 1. It should be noted that the composition is expressed in terms of at % in Table 2.

TABLE 2

| | Electrode film 13 | Plated film 14 |
|---|---|---|
| S1 | Fe70Co30 | Fe65Co30Ni5 |
| S2 | (Fe70Co30) 99B1 | Fe65Co30Ni5 |
| S3 | (Fe70Co30) 97B3 | Fe65Co30Ni5 |
| S4 | (Fe70Co30) 95B5 | Fe65Co30Ni5 |
| S5 | (Fe70Co30) 89B11 | Fe65Co30Ni5 |
| S6 | Fe63Co24B13 | Fe65Co30Ni5 |

Referring to Table 1, although the grain size of the electrode film 13 was less than 50 nm, Sample S1 having a crystal grain size of 40 nm and Sample S2 having a crystal grain size of 33 nm in the plated film 14 had a coercive force of 14.1 (Oe) and 10.4 (Oe), respectively, and at least 47% were raked C as a defective product.

In Sample S3 in which the crystal grain size of the electrode film 13 was 19 nm and the crystal grain size of the plated film 14 was 25 nm, on the other hand, none was ranked C. Also in Sample S4 in which the crystal grain size of the electrode film 13 was 14 nm and the crystal grain size of the plated film 14 was 19 nm, none was ranked C.

Considering that Sample S3 is similar to Sample S2 in material of the electrode film 13 and the plated film 14 but different therefrom in crystal grain size, the reason why no defective product was produced in Sample S3 although as much as 47% of Sample S2 were defective may be the difference in crystal grain size between Samples S2, S3 for the electrode film 13 and the plated film 14. Looking at Sample S3 and further at Sample S4, it is apparent that 100% yield without any C-ranked defective product can be assured if the crystal grain size of the electrode film 13 is 19 nm or less and the crystal grain size of the plated film 14 is 25 nm or less.

It is apparent that next Sample S5, in which the electrode film 13 was a CoFeB amorphous film and the plated film 14 was grown thereon by electroplating to have a maximum crystal grain size of 14 nm, is extremely effective because the coercive force of 5.5 (Oe) was the lowest among all Samples and as much as 98% belonged to the top rank A.

It is apparent that last Sample S6, in which the electrode film 13 was a Fe63Co24B13 amorphous film (electroless plated film) and the plated film 14 was grown thereon by electroplating to have a maximum crystal grain size of 15 nm, is extremely effective because the coercive force of 5.9 (Oe) was low and as much as 95% belonged to the top rank A.

Figure 7:
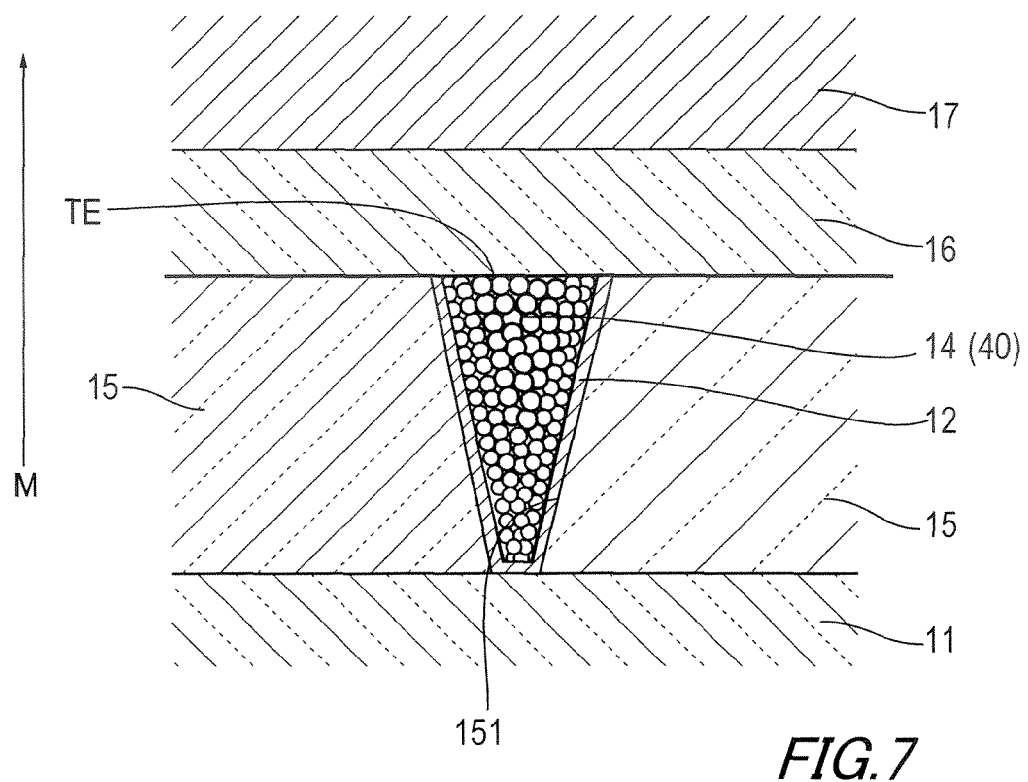
FIG. 7 is an enlarged sectional view at a magnetic pole portion according to another embodiment.

FIG. 7 is a view showing another embodiment of the main magnetic pole film 40. In this embodiment, the main magnetic pole film 40 is formed by an electroless plated film 14 which is filled in the depression 151 provided in the first non-magnetic film 15. In FIG. 7, the electroless plated film 14 is formed on the second non-magnetic film 12 formed by ALD.

The electroless plated film 14, which enables reduction of the crystal grain size and can easily be made amorphous, can avoid the problem of increase in the coercive force due to increase in the crystal grain size and ensuing pole erase.

Inside the depression 151, moreover, since the electroless plated film grows toward the center from both side walls thereof, a small grain size plated film 14 can be formed inside the depression 151, as desired in the present invention. Particularly in the case of the depression 151 having a shape whose distance is small at its bottom side but large at the opposite side, the inside of the depression 151 can be filled with the electroless plated film at an extremely early stage of electroless plating. Therefore, a magnetic head having a low coercive force can be obtained by providing a physical structure which makes the most effective use of the plated film 14 in the bottom side portion.

In the case where the magnetic pole film 14 is formed by an electroless plated film, the magnetic pole film 14 preferably contains one of FeCoB, FeCoNiB, NiP and NiB as a main component.

Figure 9:
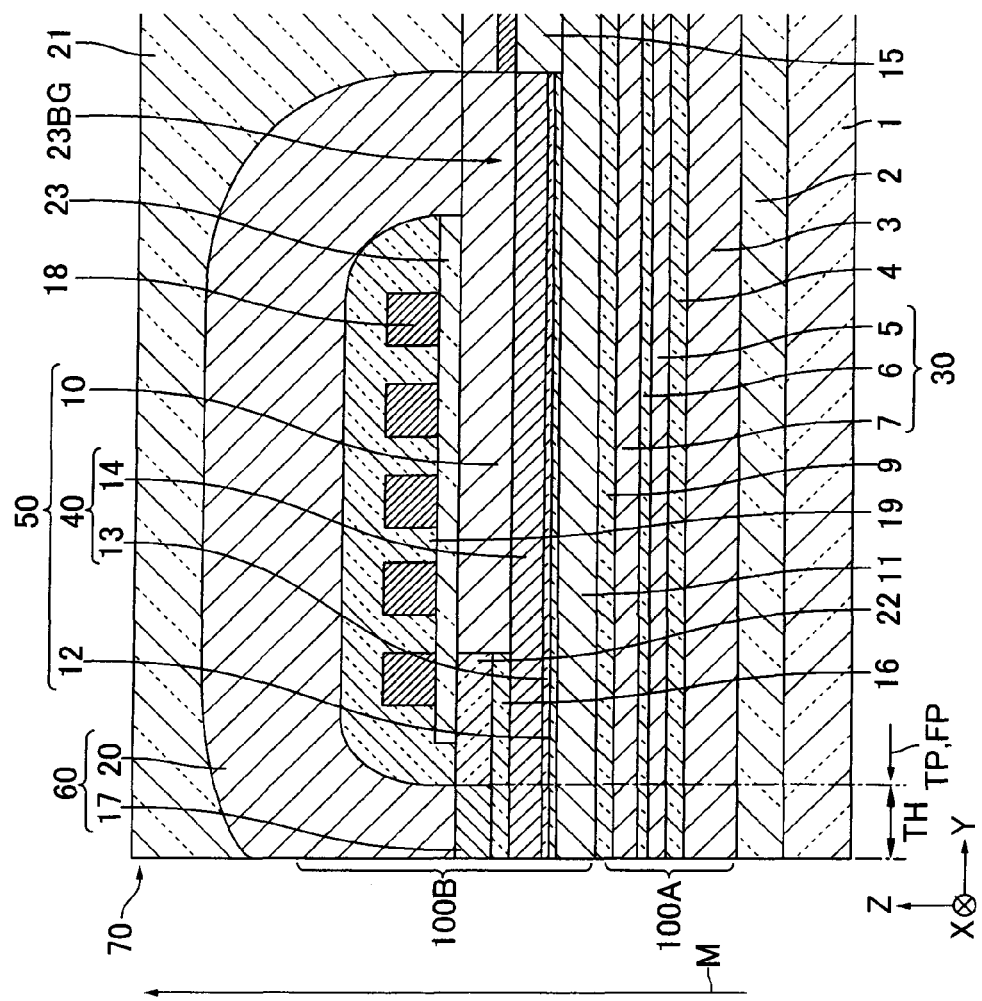
FIG. 9 is a sectional view taken along line 4-4 in FIG. 2 according to still another embodiment.
Figure 8:
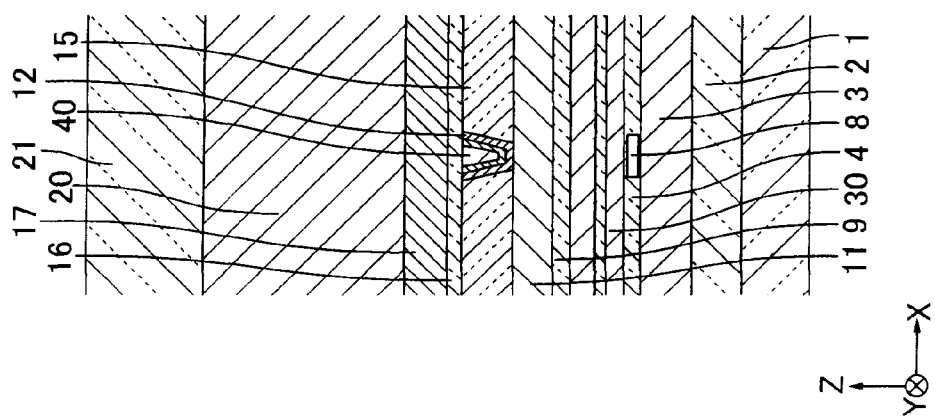
FIG. 8 is a sectional view taken along line 3-3 in FIG. 2 according to still another embodiment.

In the embodiments shown in FIGS. 1 to 7, the auxiliary magnetic pole film 10 is disposed on the leading side with respect to the main magnetic pole film 40, but is not necessarily limited thereto. For example, the auxiliary magnetic pole film 10 may be disposed on the trailing side with respect to the main magnetic pole film 40, as shown in FIGS. 8 and 9. In this case, since the auxiliary magnetic pole film 10 is disposed on the main magnetic pole film 40, the gap film 16 is partially removed within the area where the auxiliary magnetic pole film 10 is present.

In addition, a non-magnetic film 22 is embedded around the auxiliary magnetic pole film 10 to substantially define the throat height zero position TP, and an insulating film 23 is disposed between the auxiliary magnetic pole film 10 and the coil film 18 to electrically separate the coil film 18 from the auxiliary magnetic pole film 10. The non-magnetic film 22 and the insulating film 23 are made of, for example, a non-magnetic insulating material similar to that of the non-magnetic films 11, 15. The return yoke film 20 is connected at its rear to the auxiliary magnetic pole film 10. The surfaces of the auxiliary magnetic pole film 10, the write shield film 17 and the insulating film 22 are preferably flattened. In addition, the second non-magnetic film 12 may extend, for example, to a back gap 23BG like the main magnetic pole film 40. Also in this case, the same effects can be obtained.

2. Method for Manufacturing the Magnetic Head

Next will be described a method for manufacturing the magnetic head according to the present invention with reference to FIGS. 10 to 22. The manufacturing method according to the present invention is particularly directed to a perpendicular recording element manufacturing method in the production process of the magnetic head. The processes before the production process of the perpendicular recording element have been known heretofore and do not require specific description. Roughly speaking, it can be manufactured by layering a series of components in order by using a conventional thin-film process including a film formation technique such as plating or sputtering, a patterning technique such as photolithography, an etching technique such as dry etching or wet etching, and a polishing technique such as CMP (chemical mechanical polishing).

Roughly speaking with reference to FIGS. 1 to 9 and so on, when manufacturing the magnetic head, at first, the insulating film 2 is formed on the substrate 1, and then the lower read shield film 3, the shield gap film 4 embedded with the MR element 8, and the upper read shield film 30 (the upper read shield film portions 5, 7 and the non-magnetic film 6) are deposited on the insulating film 2 in the mentioned order, thereby forming the reproducing head portion 10A.

Subsequently, the separating film 9 is formed on the reproducing head portion 10A, and then the magnetic pole film 50 (the auxiliary magnetic pole film 10, the second non-magnetic film 12, and the main magnetic pole film 40) enclosed with the non-magnetic films 11, 15, the gap film 16, the coil film 18 covered with the insulating film 19, and the magnetic film 60 (the write shield film 17 and the return yoke film 20) are deposited on the separating film 9 in the mentioned order, thereby forming the recording head portion 100B. Finally, the overcoat film 21 is formed on the recording head portion 100B, and then the air bearing surface 70 is formed by using a machining process or a polishing process, thereby completing the magnetic head.

Figure 10:
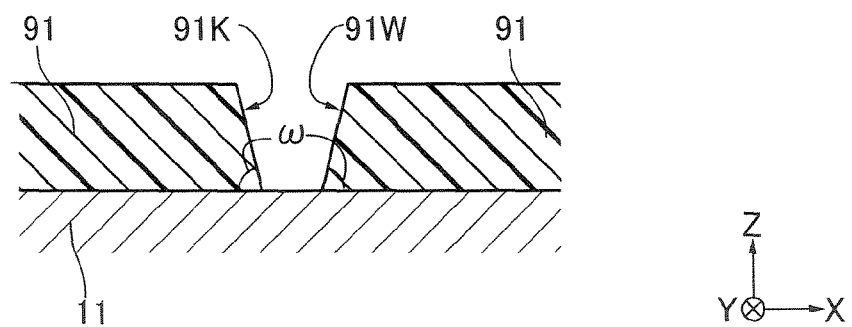
FIG. 10 is a view showing a step for manufacturing the magnetic head shown in FIGS. 1 to 9.

When manufacturing the perpendicular recording element of the magnetic head, which is the subject of the present invention, at first, after formation of the non-magnetic film 11, a resist pattern 91 is formed on the non-magnetic film 11 to have an opening 91K, as shown in FIG. 10. Upon formation of the resist pattern 91, a resist film is formed by applying a resist onto the non-magnetic film 11 and then subjected to patterning (exposure and development) by using photolithography. In this case, exposure conditions are adjusted such that the opening 91K spreads with distance from the non-magnetic film 11 and an inclination ω of an inner wall 91W (or angle between the inner wall 91W and the surface of the non-magnetic film 11) is equal to the bevel angle θ (see FIG. 5).

Figure 11:
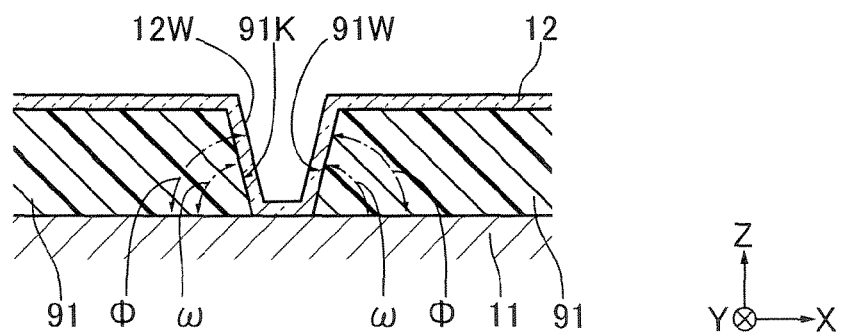
FIG. 11 is a view showing a step after the step shown in FIG. 10.

Thereafter, as shown in FIG. 11, the second non-magnetic film 12 is formed in such a manner as to narrow the opening 91K by covering at least the inner wall 91W of the resist pattern 91 in the opening 91K using a dry film formation method.

Upon formation of the second non-magnetic film 12, for example, the surface of the resist pattern 91 (including the inner wall 91W) and the exposed surface of the non-magnetic film 91 in the opening 91K are covered using ALD. Particularly in this case, the film formation temperature (so-called substrate temperature) by ALD should be lower than the deformation temperature (or glass transition temperature) of the resist pattern 91. Since the use of ALD results in that the second non-magnetic film 12 covers the inner wall 91W with an uniform thickness, an inclination Φ of an inner wall 12W of the second non-magnetic film 12 corresponding to the inner wall 91W (or angle between the inner wall 12W and the surface of the non-magnetic film 11) is equal to the inclination ω.

Figure 12:
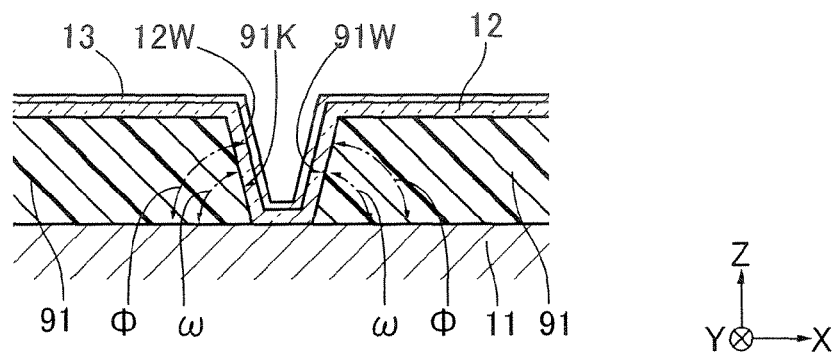
FIG. 12 is a view showing a step after the step shown in FIG. 11.

Then, a magnetic film for formation of the main magnetic pole film 40 is formed in such a manner as to fill at least the opening 91K where the second non-magnetic film 12 is formed. Concretely, for example, the electrode film 13 is formed on the second non-magnetic film 12 by using sputtering, as shown in FIG. 12. The electrode film 13 is formed as an amorphous film or to have a maximum crystal grain size of, for example, preferably 20 nm or less. The material composition of the electrode film 13 has been described hereinabove.

Figure 13:
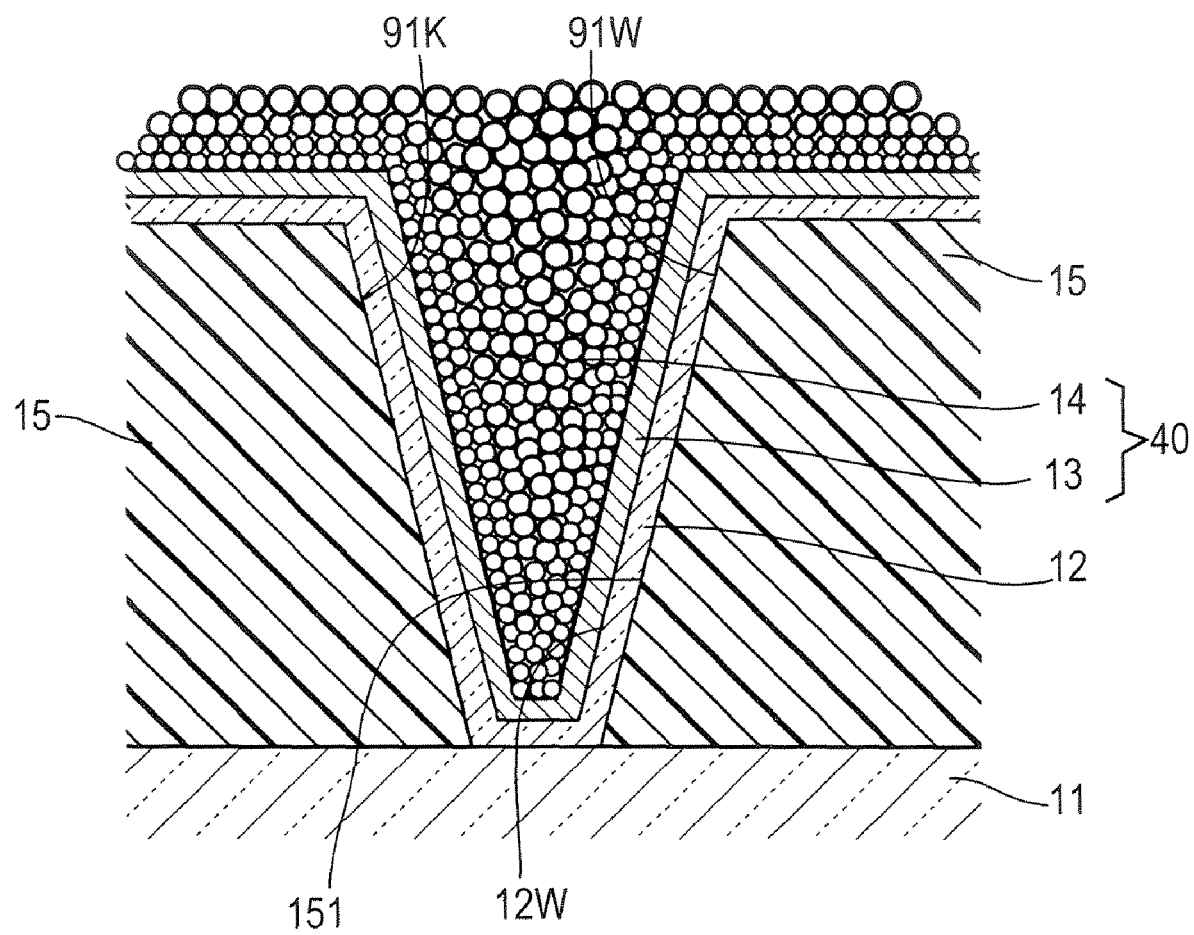
FIG. 13 is a view showing a step after the step shown in FIG. 12.
Figure 14:
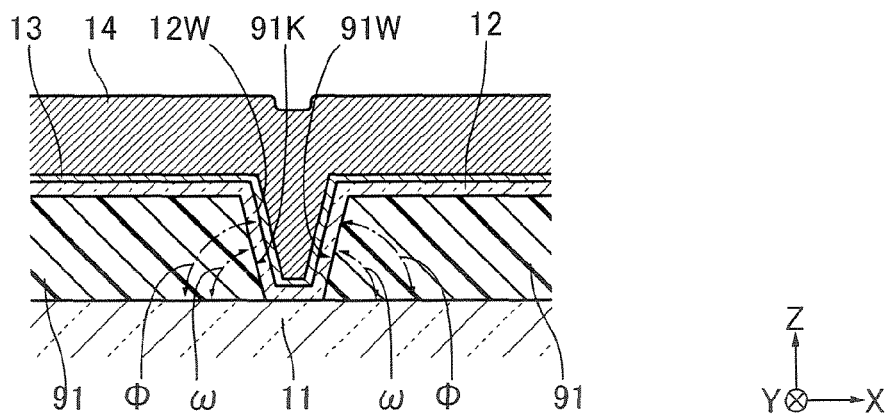
FIG. 14 is a view showing a step after the step shown in FIG. 13.

Next, the plated film 14 is grown by performing electroplating with the electrode film 13 as a seed film, as shown in FIG. 13. Accordingly, the plated film 14 grows on the electrode film 13 to fill the opening 91K, as shown in FIG. 14. If the electrode film 13 intended to function as a seed film is amorphous, the plated film 14 growing thereon can avoid the problem of increase in the crystal grain size due to inheriting the crystal structure of the seed film. Therefore, the plated film 14 becomes a magnetic pole film with a small crystal grain size, and hence, there can be obtained a perpendicular magnetic head whose main magnetic pole film 40 has a low coercive force.

In addition, since the plated film 14 is grown by electroplating on the electrode film 13 disposed on the inner surface of the depression 151, the plated film 14 grows toward the center of the depression 151 from both side walls thereof. Moreover, the crystal grain size of the plated film 14 decreases toward the electrode film 13 intended to function as a seed film, as shown in FIG. 13. Hence, at a relatively early stage of the plate growth, the plated film 14 is formed with a small grain size, as desired in the present invention.

Figure 15:
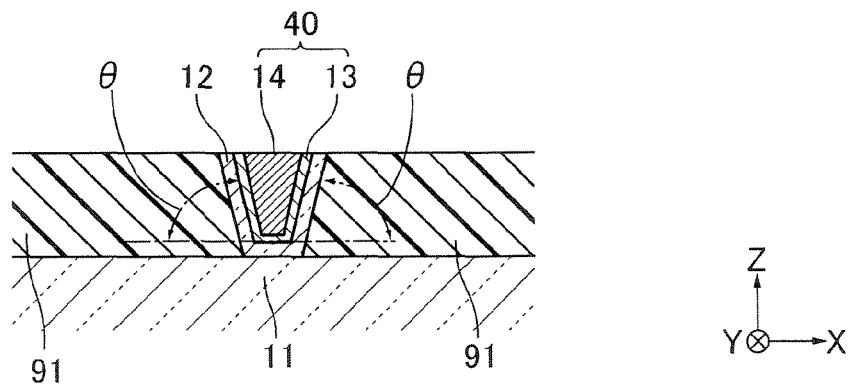
FIG. 15 is a view showing a step after the step shown in FIG. 14.

Then, the second non-magnetic film 12, the electrode film 13 and the plated film 14 are selectively removed until at least the resist pattern 91 is exposed, thereby forming the main magnetic pole film 40 as a magnetic film pattern to fill the opening 91K where the second non-magnetic film 12 is formed, as shown in FIG. 15. Upon removing the second non-magnetic film 12, the electrode film 13 and the plated film 14, for example, a polishing method such as CMP or an etching method such as ion milling or reactive ion etching (RIE) may be adopted. Upon formation of the main magnetic pole film 40, the bevel angle θ is set equal to the inclination Φ of the second non-magnetic film 12, and in other words, the bevel angle θ is set equal to the inclination ω of the resist pattern 91.

Figure 16:
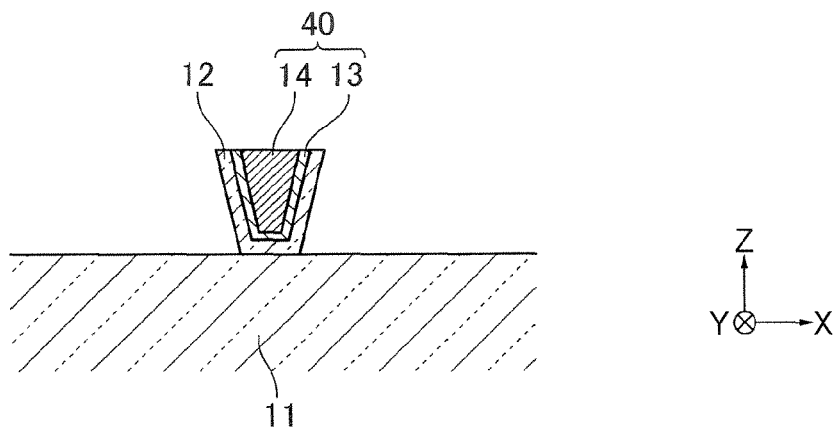
FIG. 16 is a view showing a step after the step shown in FIG. 15.
Figure 17:
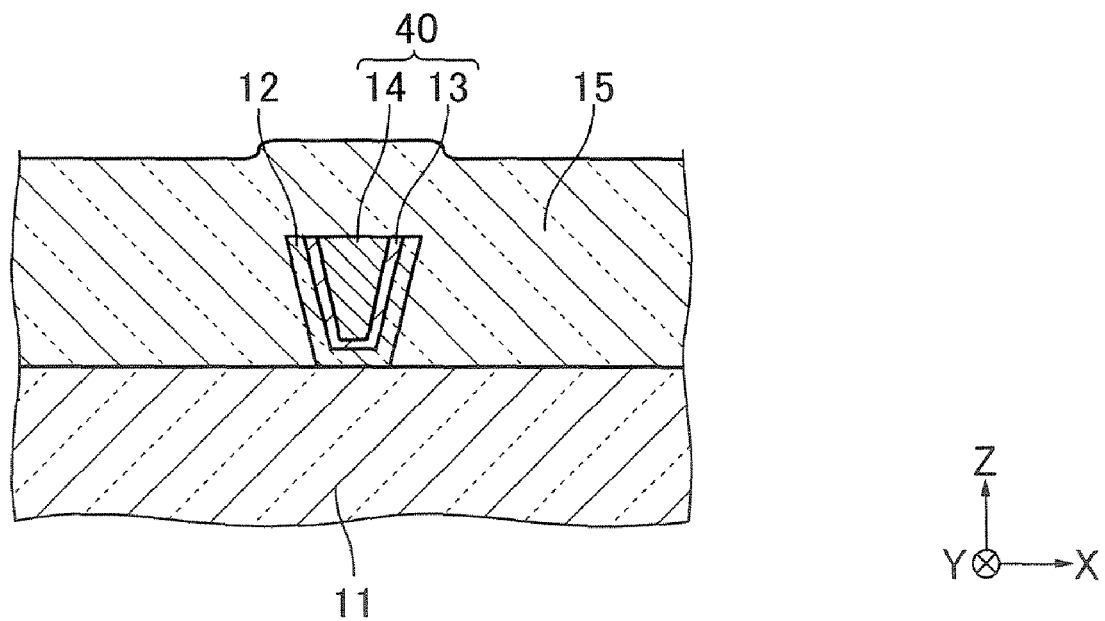
FIG. 17 is a view showing a step after the step shown in FIG. 16.
Figure 18:
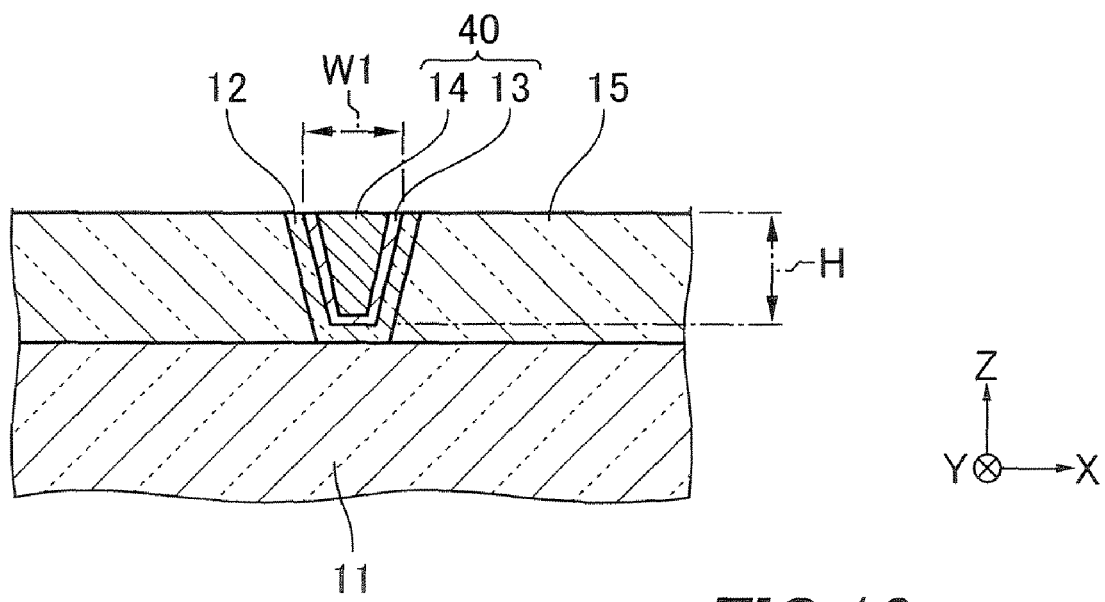
FIG. 18 is a view showing a step after the step shown in FIG. 17.

Then, after the remaining resist pattern 91 is removed by using washing with an organic solvent or ashing, as shown in FIG. 16, the first non-magnetic film 15 is formed, for example, by using sputtering to cover the second non-magnetic film 12 and the main magnetic pole film 40, as shown in FIG. 17. Subsequently, the first non-magnetic film 15 is selectively removed (polished) until at least the second non-magnetic film 12 and the main magnetic pole film 40 are exposed, for example, by using CMP, thereby flattening the second non-magnetic film 12, the main magnetic pole film 40 and the first non-magnetic film 15, as shown in FIG. 18. In the polishing process, the polishing amount should be adjusted, for example, to set the width W1 and the height H of the main magnetic pole film 40 to desired values.

Finally, the air bearing surface 70 is formed at the next step, thereby forming the end face 40M of the main magnetic pole film 40 and the end face 60M of the magnetic film 60. Upon formation of the air bearing surface 70, the difference in hardness between the main magnetic pole film 40 and the first and second non-magnetic films 15, 12 is utilized, for example, by adjusting processing conditions such as polishing conditions, so that the second non-magnetic film 12 recedes from the first non-magnetic film 15 and the main magnetic pole film 40 projects from the second non-magnetic film 12 to have the end face 40M flush with the air bearing surface 70.

In the foregoing embodiment, the second non-magnetic film 12 is formed by ALD. The use of ALD itself is not the direct subject of the present invention, but its advantages will be described with reference to FIGS. 11 to 15 showing its application process and FIGS. 1 to 8 and so on.

In case where both the first and second non-magnetic films 12, 15 are formed by sputtering or the like, since there is no difference in hardness therebetween, the second non-magnetic film 12 does not recede from the first non-magnetic film 15 through the processing of the air bearing surface 70. In this case, since the front end portion 40A is entirely enclosed by the second non-magnetic film 12 to maximize the contact area of the second non-magnetic film 12 with the front end portion 40A, the effect of residual stress on the second non-magnetic film 12 applied to the front end portion 40A increases extremely, tending to cause fixing of the magnetic domain structure of the front end portion 40A (or domain lock). Thus, the magnetic domain structure of the front end portion 40A is changed from its original state at the time of formation of the main magnetic pole film 40. If the magnetic domain structure of the front end portion 40A is fixed, the residual magnetic flux of the main magnetic pole film 40 tends to leak through the front end portion 40A when recording is not performed, increasing the probability of pole erase.

If there is adopted a process in which the second non-magnetic film 12 is formed by ALD and the first non-magnetic film 15 is formed by sputtering or the like, on the other hand, since there is some difference in hardness therebetween, the difference in hardness therebetween can be utilized upon processing the air bearing surface 70 to let the second non-magnetic film 12 recede from the first non-magnetic film 15.

In the foregoing magnetic head manufacturing method, furthermore, the main magnetic pole film 40 (the front end portion 40A) is formed in the opening 91K by: (1) forming the resist pattern 91 with the opening 91K; (2) forming the second non-magnetic film 12 to narrow the opening 91K; (3) depositing the electrode film 13 and the plated film 14 to fill the opening 91K where the second non-magnetic film 12 is formed; and (4) selectively removing the second non-magnetic film 12, the electrode film 13 and the plated film 14 until the resist pattern 91 is exposed. In this case, if the second non-magnetic film 12 is formed by using a dry film formation method, which is excellent in controlling the film thickness, so as to narrow the opening 91K, the final opening width (or width over which the front end portion 40A is to be formed) becomes less variable as compared with a conventional case of using an insoluble film whose film thickness is difficult to control. Thus, the trailing edge width W1 can be decreased to a width that cannot be realized with photolithography (approximately 0.2 µm or less) while achieving accuracy similar to that with photolithography.

Furthermore, since only the step of forming the second non-magnetic film 12 is required as a film forming step to form the main magnetic pole film 40, the number of processing steps can be reduced as compared with a conventional case where a strippable film forming step is required in addition to an additional film forming step. This simplifies the formation process of the main magnetic pole film 40. Thus, the production process of the magnetic head can be performed with high accuracy and simplified.

In cases of using a method other than ALD, when the second non-magnetic film 12 is formed to cover the inner wall 91W of the resist pattern 91, the thickness of the second non-magnetic film 12 may vary along the inner wall 91W depending on the depth or inclination ω of the opening 91K, causing the possibility that the inclination Φ will differ from the inclination ω. This thickness variation may be, for example, such that the thickness of the second non-magnetic film 12 increases with distance from the non-magnetic film 11. In this case, since the bevel angle θ differs from the inclination ω, the trailing edge width W1 and the bevel angle θ differ from their desired values. The accuracy of determining the trailing edge width W1 and the bevel angle θ in this case is higher than in conventional cases but may be insufficient to meet a manufacturing specification that requires strict accuracy.

In the case of using ALD, on the other hand, since the thickness of the second non-magnetic film 12 is uniform along the inner wall 91K, as shown in FIG. 11, the inclination Φ is equal to the inclination ω. In this case, since the bevel angle θ is equal to the inclination ω, as shown in FIG. 15, the trailing edge width W1 and the bevel angle θ coincide with their desired values. Thus, since the accuracy of determining the trailing edge width W1 and the bevel angle θ can be sufficiently increased by controlling the bevel angle θ based on the inclination ω, the main magnetic pole film 40 can be formed with higher accuracy.

Particularly, the resist pattern 91 can be made less prone to deformation in the formation process of the second non-magnetic film 12 by setting the film formation temperature by ALD lower than the glass transition temperature of the resist pattern 91. In this case, deformation of the resist pattern due to foaming or variation of the inclination ω from its original value at the time of formation due to flowing can be prevented. Accordingly, also from this viewpoint, the main magnetic pole film 40 can be formed with high accuracy.

It should be noted that although in the present embodiment, the determination of the width W1 and the height H of the main magnetic pole film 40 is carried out by using a polishing process at the time of polishing the first non-magnetic film 15, but is not necessarily limited thereto. For example, as shown in FIGS. 17 and 18, the width W1 and the height H may be determined by using a polishing process at the time of forming the plated film 14 or the like. Also in this case, the same effects can be obtained.

Figure 19:
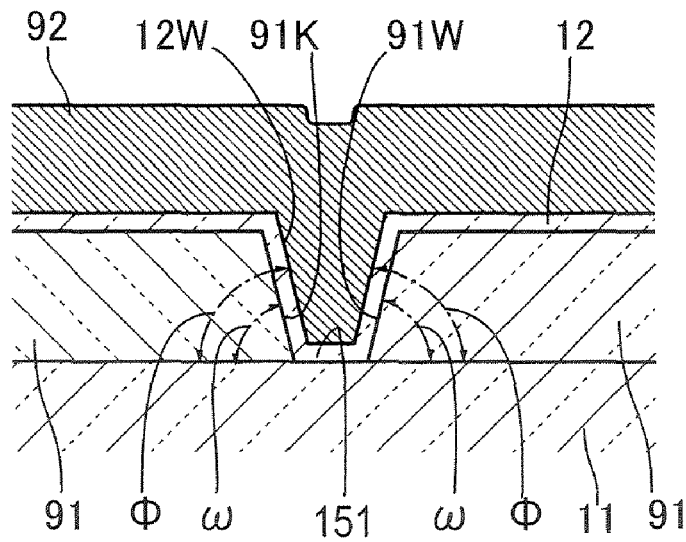
FIG. 19 is a view showing an another step for manufacturing the magnetic head.
Figure 20:
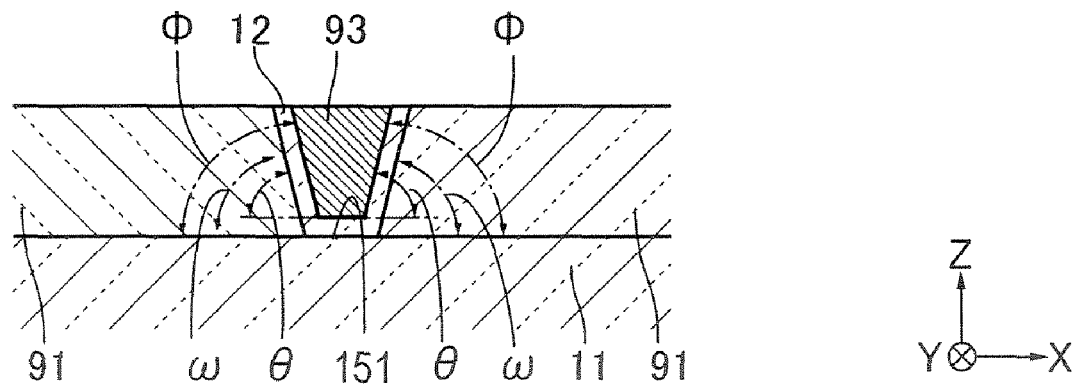
FIG. 20 is a view showing a step after the step shown in FIG. 19.

FIGS. 19 and 20 are views showing another method for manufacturing the magnetic head according to the present invention. In this manufacturing method, after the second non-magnetic film 12 is formed by using above ALD, the plated film 14 is formed by electroless plating on the second non-magnetic film 12. Thereafter, the second non-magnetic film 12 and a magnetic film 92 are selectively removed until the resist pattern 91 is exposed.

The electroless plated film 14, which enables reduction of the crystal grain size and can easily be made amorphous, can avoid the problem of increase in the coercive force due to increase in the crystal grain size and ensuing pole erase.

In addition, since electroless plating is a process that is extremely excellent in so-called "coverage", the plated film can be formed with high accuracy even inside the depression 151, which is formed in a fine pattern.

Inside the depression 151, moreover, since the electroless plated film 14 grows toward the center from both side walls thereof, a small grain size plated film can be formed inside the depression 151, as desired in the present invention.

In the case where the magnetic pole film is formed by the electroless plated film 14, the magnetic pole film preferably contains one of FeCoB, FeCoNiB, NiP and NiB as a main component. These materials can be made amorphous to avoid the problem of increase in the coercive force and ensuing pole erase.

Figure 21:
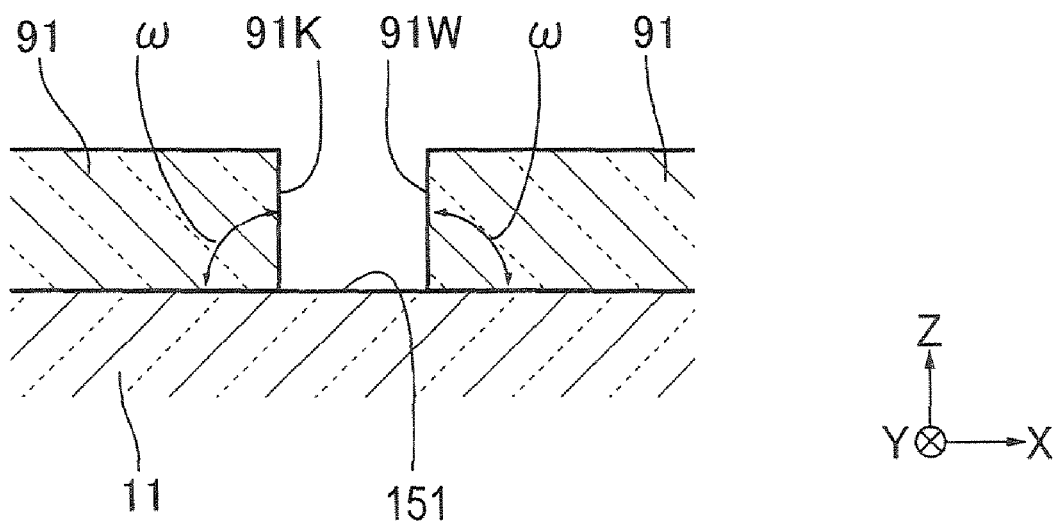
FIG. 21 is a view showing a still another step for manufacturing the magnetic head.
Figure 22:
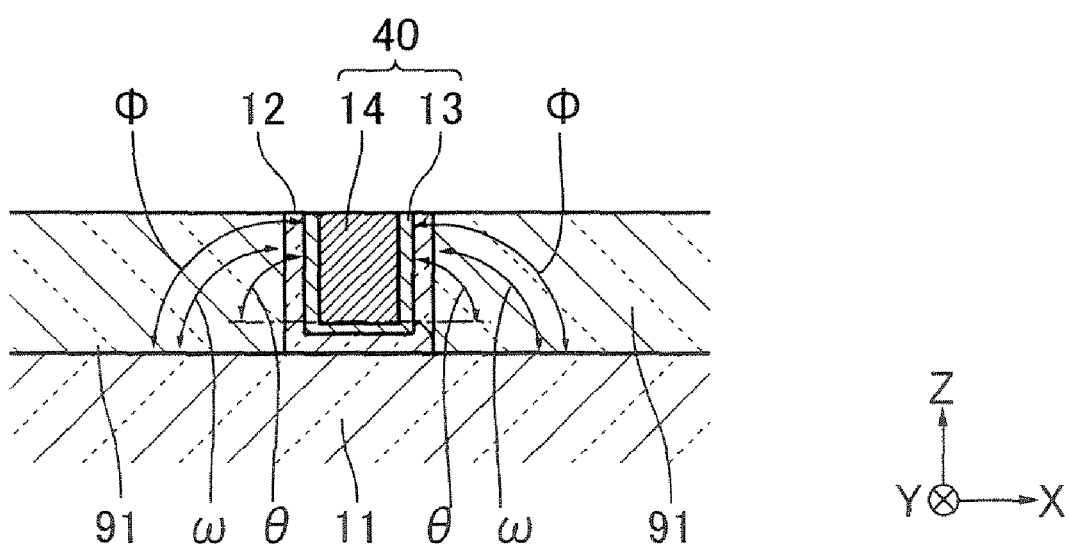
FIG. 22 is a view showing a step after the step shown in FIG. 21.

Although in the foregoing embodiments, the main magnetic pole film 40 is formed to have an inverted trapezoid cross-section by forming the resist pattern 91 with the inner wall 91W inclined with respect to the surface of the non-magnetic film 11 (the inclination ω<90 degrees), but is not necessarily limited thereto. For example, as shown in FIG. 21, the main magnetic pole film 40 may be formed to have a rectangular cross-section by forming the resist pattern 91 with the inner wall 91W of the depression 151 normal to the surface of the non-magnetic film 11 (the inclination ω=90 degrees). Also in this case, the same effects can be obtained.

3. Head Assembly

The present invention further discloses a head assembly. The head assembly includes the foregoing magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (or gimbal) and an HAA (head arm assembly) in which the HGA is mounted on an arm.

Figure 23:
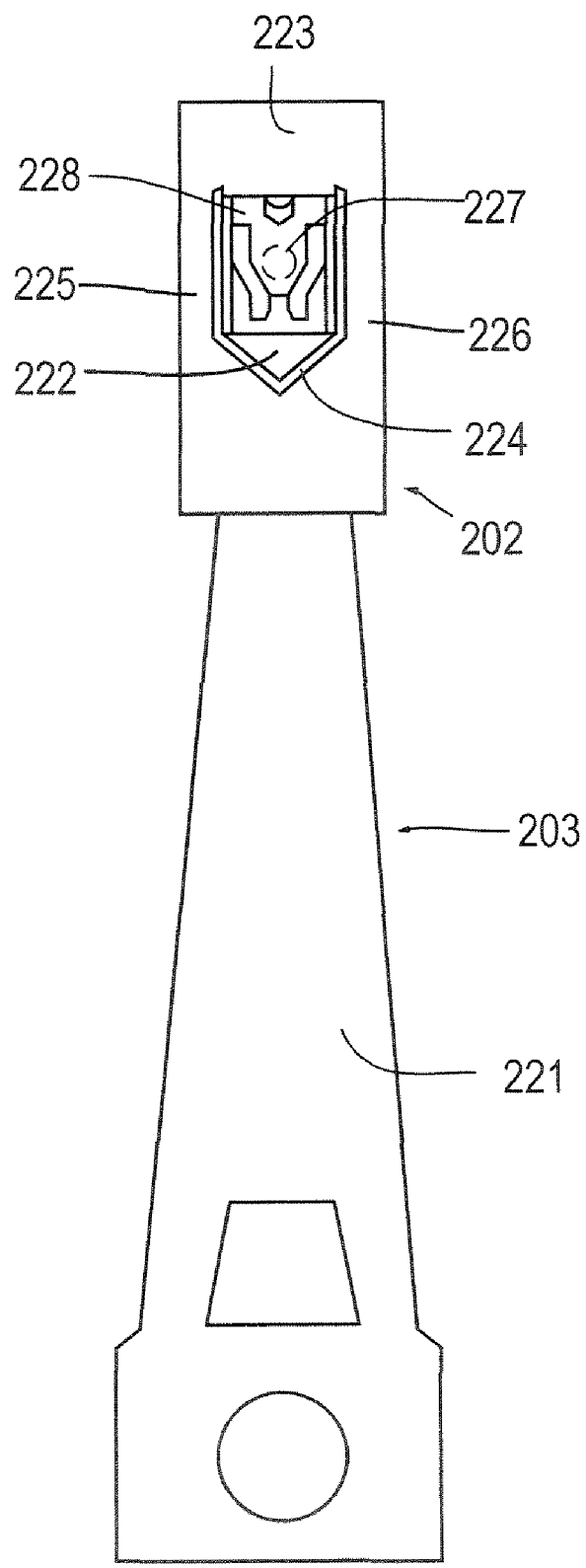
FIG. 23 is a plan view of an HGA according to the present invention.
Figure 24:
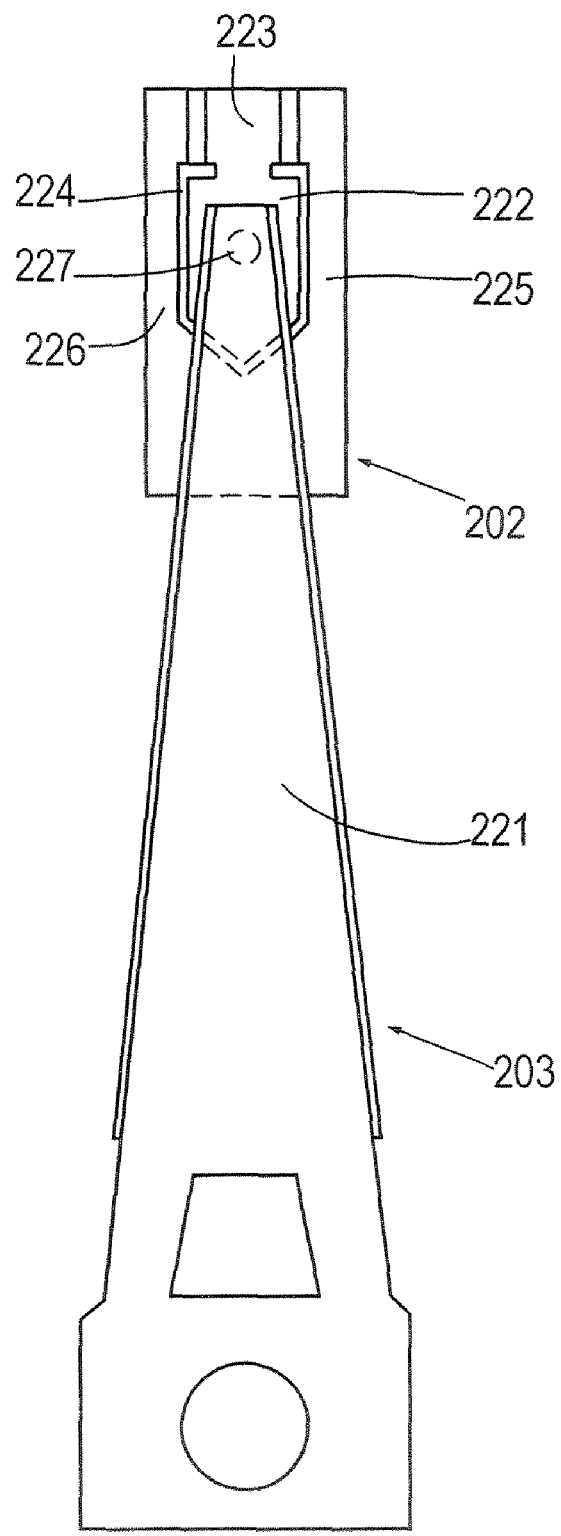
FIG. 24 is a bottom view of the HGA shown in FIG. 23.

FIG. 23 is a front view of a head assembly according to the present invention, and FIG. 24 is a bottom view of the head assembly shown in FIG. 23. The illustrated head assembly is an HGA including a suspension 203 and a magnetic head 228.

The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The magnetic head 228 is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the tongue portion 222 and the outer frame portions 225, 226, extending around the tongue portion 222. The magnetic head 228 is attached to one side of the tongue portion 222 through an adhesive or the like to be in spring contact with the tip of the load dimple 227.

One face of the magnetic head 228 opposite to the air bearing surface of the slider is attached to the tongue portion 222 of the suspension 203. Flexible leads and the like not shown in the drawings are connected to the magnetic head 228.

Figure 25:
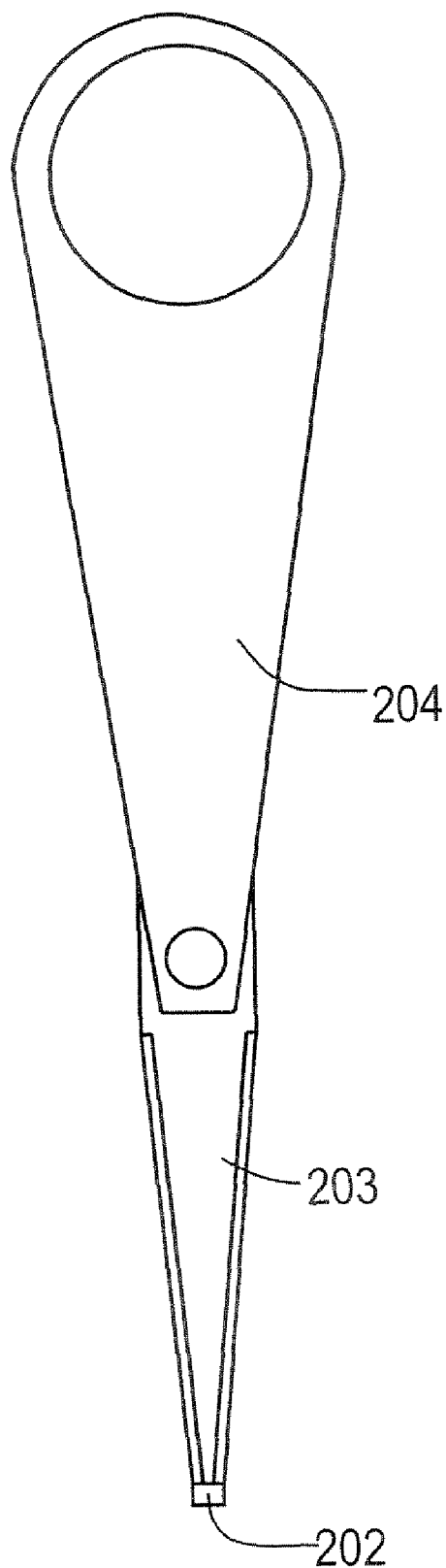
FIG. 25 is a plan view of an HAA according to the present invention.

FIG. 25 is a front view of an HAA. The illustrated HAA includes the suspension 203, the magnetic head 228 and an arm 204. The arm 204 is integrally formed of a suitable non-magnetic metallic material such as an aluminium alloy. The arm 204 is provided with a mounting hole. The mounting hole is used for mounting on a positioning device provided in a magnetic disk apparatus. One end of the suspension 203 is secured to the arm 204, for example, with a ball connecting structure.

4. Magnetic Recording/Reproducing Apparatus

Figure 26:
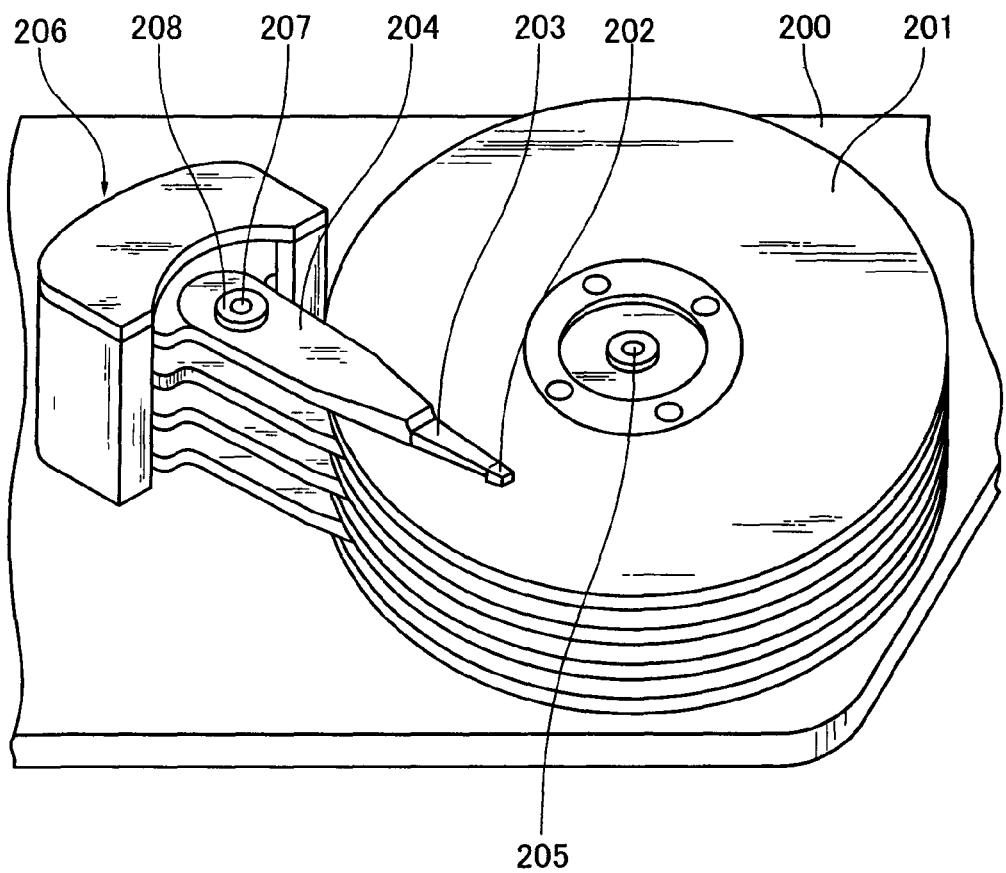
FIG. 26 is a perspective view of a magnetic recording apparatus according to the present invention.

Next will be described a structure of a magnetic recording apparatus mounted with the magnetic head according to the present invention. FIG. 26 shows the structure of the magnetic recording apparatus. The magnetic recording apparatus, which is mounted with the foregoing magnetic head, is, for example, a hard disk drive.

As shown in FIG. 26, for example, the magnetic recording apparatus includes, within a case 200, a plurality of magnetic disks (e.g., hard disks) 201 corresponding to the recording medium 80 for magnetically recording information, a plurality of suspensions 203 disposed corresponding to the respective magnetic disks 201 and supporting the magnetic heads at their one ends, and a plurality of arms 204 supporting the other ends of the suspensions 203. The magnetic disks 201 are rotatable about a spindle motor 205 which is fixed to the case 200. The arms 204 are connected to an actuator 206 which functions as a power source and are pivotable through a bearing 208 about a fixed shaft 207 which is fixed to the case 200.

The actuator 206 is constructed to include, for example, a driving source such as a voice coil motor. For example, the magnetic recording apparatus is a model where the plurality of arms 204 are pivotable about the fixed shaft 207 in an integrated manner. In FIG. 26, the case 200 is shown partially cut-out to make it easy to see the internal structure of the magnetic recording apparatus.

The magnetic head 228 is a magnetic head according to the present invention. When the magnetic disk 201 rotates for recording or reproducing information, an air flow generated between the recording surface (or magnetic head-facing surface) of the magnetic disk 201 and the air bearing surface 220 is utilized to let the magnetic head take off from the recording surface of the magnetic disk 201.

Figure 27:
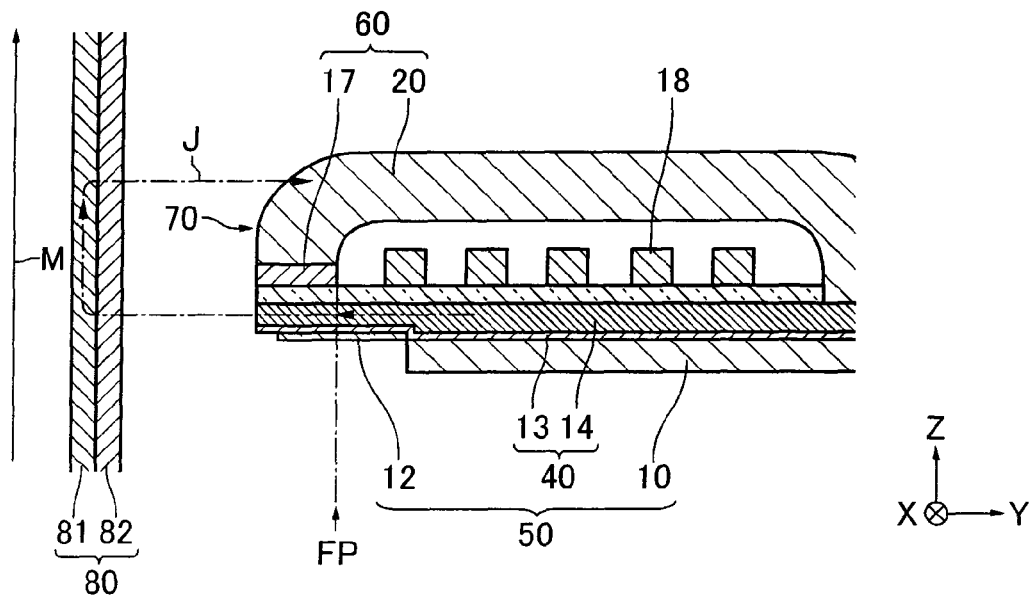
FIG. 27 is a view illustrating recording operation of the magnetic recording/reproducing apparatus shown in FIG. 26.

As shown in FIG. 27, the recording medium 80 includes, for example, a magnetization film 81 and a soft magnetic film 82 disposed remote from and close to the magnetic head, respectively. The magnetization film 81 functions to magnetically record information, while the soft magnetic film 82 functions as a path of a magnetic flux (so-called flux path) in the recording medium 80. The recording medium 80 of this type is generally called "double layer recording medium" for perpendicular recording. Needless-to-say, the recording medium 80 may include another layer, for example, in addition to the above magnetization film 81 and soft magnetic film 82.

The upwardly directed arrow shown in FIG. 27 indicates the moving direction M along which the recording medium 80 relatively moves with respect to the magnetic head. Assuming that the movement of the recording medium 80 moving in the moving direction M is a kind of flow, the foregoing "trailing side" refers to a flow-out side (or front side in the moving direction M), and particularly in this case, refers to an upper side in the thickness direction (Z-axis direction). On the other hand, a flow-in side (or rear side in the moving direction M) is referred to as "leading side", and particularly in this case, corresponds to a lower side in the thickness direction. The upper end edge E1, which is a recording portion of the main magnetic pole film 40, is called "trailing edge TE", and its width W1 is called "trailing edge width".

Recording and reproducing operations to be performed by the above magnetic recording/reproducing apparatus will be described with reference to FIG. 27. When recording information, specifically, a recording magnetic flux J is generated as a current flows from an external circuit not shown in the drawings to the coil film 18 of the recording head portion 100B. After absorbed in the auxiliary magnetic pole film 10 and the main magnetic pole film 40 of the magnetic pole film 50, the magnetic flux J flows toward the front end portion 40A. At this time, since the magnetic flux J is focused because of narrowing at the flare point FP, it is finally concentrated in the vicinity of the trailing edge TE. When the magnetic flux J concentrated in the vicinity of the trailing edge TE is emitted to generate a perpendicular magnetic field, the magnetization film 81 is magnetized by the perpendicular magnetic field, thereby magnetically recording information on the recording medium 80.

In this case, the gradient of the perpendicular magnetic field increases because the spreading component of the magnetic flux J is absorbed in the write shield film 17. The magnetic flux J absorbed in the write shield film 17 is resupplied to the magnetic pole film 50 through the return yoke film 20.

After magnetization of the magnetization film 81, the magnetic flux J emitted from the magnetic pole film 50 toward the recording medium 80 is absorbed in the return yoke film 20 through the soft magnetic film 82. At this time, a part of the magnetic flux J is also absorbed in the write shield film 17. The magnetic flux J absorbed in the write shield film 17 and the return yoke film 20 is also resupplied to the magnetic pole film 50. This enables circulation of the magnetic flux J between the recording head portion 100B and the recording medium 80.

In the magnetic head according to the present invention, moreover, since the crystal grain size is small even at the trailing edge TE important for writing, it can contribute to resolving the problem of increase in the coercive force due to increase in the crystal grain size.

When reproducing information, on the other hand, as a sense current flows through the MR element 8 of the reproducing head portion 100A, the resistance value of the MR element 8 changes depending on the reproducing signal magnetic field from the recording medium 80. Information recorded on the recording medium 80 can be magnetically reproduced by detecting the resistance change as a voltage change.

Since the magnetic recording apparatus is mounted with the foregoing magnetic head, the operating characteristics of the magnetic recording apparatus can be stabilized and the production process can be performed with high accuracy and simplified.

The present invention has been described in detail above with reference to preferred embodiments. However, obviously those skilled in the art could easily devise various modifications of the invention based on the technical concepts underlying the invention and teachings disclosed herein.

What is claimed is:

1. A magnetic head comprising a slider and a recording element,
    wherein said recording element includes a non-magnetic film and a magnetic pole film and is supported by said slider,
    said non-magnetic film has a depression,
    said magnetic pole film includes an electrode film and a plated film,
    said electrode film is an amorphous film adhered to an inner surface of said depression,
    said plated film is a film grown on said electrode film, and
    said electrode film contains one of FeCoB, FeCoNiB, NiP and NiB as a main component.

2. A magnetic head comprising a slider and a recording element,
    wherein said recording element includes a non-magnetic film and a magnetic pole film and is supported by said slider,
    said non-magnetic film has a depression,
    said magnetic pole film includes an electrode film and a plated film,
    said electrode film is an amorphous film adhered to an inner surface of said depression, and
    said plated film is a film grown on said electrode film to have a crystal grain size in the range of 14 nm to 25 nm.

3. The magnetic head of claim 2, wherein said plated film contains one of FeNi, FeCo and FeCoNi as a main component.

4. The magnetic head of claim 2, wherein said electrode film is an electroless plated film.

5. The magnetic head of claim 2, wherein said electrode film contains one of FeCoB, FeCoNiB, NiP and NiB as a main component.

6. The magnetic head of claim 2, wherein a first non-magnetic film is formed on said inner surface of said depression by ALD (atomic layer deposition), and said electrode film is adhered onto said first non-magnetic film.

7. The magnetic head of claim 2, which further includes a reproducing element.

8. A magnetic head comprising a slider and a recording element,
    wherein said recording element includes a non-magnetic film and a magnetic pole film and is supported by said slider,
    said non-magnetic film has a depression,
    said magnetic pole film includes an electrode film and a plated film,
    said electrode film is a film adhered to an inner surface of said depression, and
    said plated film is a film grown on said electrode film to have a crystal grain size in the range of 14 nm to 25 nm.

9. The magnetic head of claim 8, wherein said electrode film has a crystal grain size of 20 nm or less.

10. The magnetic head of claim 8, wherein said plated film contains one of FeNi, FeCo and FeCoNi as a main component.

11. The magnetic head of claim 8, wherein said electrode film is an electroless plated film.

12. The magnetic head of claim 8, wherein said electrode film contains one of FeCoB, FeCoNiB, NiP and NiB as a main component.

13. The magnetic head of claim 8, wherein a first non-magnetic film is formed on said inner surface of said depression by ALD (atomic layer deposition), and said electrode film is adhered onto said first non-magnetic film.

14. The magnetic head of claim 8, which further includes a reproducing element.

15. A head assembly comprising a magnetic head and a head support device,
    wherein said magnetic head includes a slider and a recording element,
    said recording element includes a non-magnetic film and a magnetic pole film and is supported by said slider,
    said non-magnetic film has a depression,
    said magnetic pole film includes an electrode film and a plated film,
    said electrode film is an amorphous film adhered to an inner surface of said depression,
    said plated film is a film grown on said electrode film to have a crystal grain size in the range of 14 nm to 25 nm; and
    said head support device supports said magnetic head in such a manner as to permit rolling and pitching of said magnetic head.

16. The head assembly of claim 15, which further includes a reproducing element.

17. A head assembly comprising a magnetic head and a head support device,
    wherein said magnetic head includes a slider and a recording element,
    said recording element includes a non-magnetic film and a magnetic pole film and is supported by said slider,
    said non-magnetic film has a depression,
    said magnetic pole film includes an electrode film and a plated film,
    said electrode film is a film adhered to an inner surface of said depression, said plated film is a film grown on said electrode film to have a crystal grain size in the range of 14 nm to 25 nm, and said head support device supports said magnetic head in such a manner as to permit rolling and pitching of said magnetic head.

18. The head assembly of claim 17, wherein said electrode film has a crystal grain size of 20 nm or less.

19. The head assembly of claim 17, which further includes a reproducing element.

20. A magnetic recording/reproducing apparatus comprising a head assembly and a magnetic recording medium, wherein said head assembly includes a magnetic head and a head support device, said magnetic head includes a slider and a recording element, said recording element includes a non-magnetic film and a magnetic pole film and is supported by said slider, said non-magnetic film has a depression, said magnetic pole film includes an electrode film and a plated film, said electrode film is an amorphous film adhered to an inner surface of said depression, said plated film is a film grown on said electrode film to have a crystal grain size in the range of 14 nm to 25 nm, said head support device supports said magnetic head in such a manner as to permit rolling and pitching of said magnetic head, and said head assembly cooperates with said magnetic recording medium to record magnetic data on said magnetic recording medium.

21. The magnetic recording/reproducing apparatus of claim 20, wherein said magnetic head further includes a reproducing element.

22. A magnetic recording/reproducing apparatus comprising a head assembly and a magnetic recording medium, wherein said head assembly includes a magnetic head and a head support device, including a slider and a recording element, said magnetic head includes a slider and a recording element, said recording element includes a non-magnetic film and a magnetic pole film and is supported by said slider, said non-magnetic film has a depression, said magnetic pole film includes an electrode film and a plated film, said electrode film is a film adhered to an inner surface of said depression, said plated film is a film grown on said electrode film to have a crystal grain size in the range of 14 nm to 25 nm, said head support device supports said magnetic head in such a manner as to permit rolling and pitching of said magnetic head, and said head assembly cooperates with said magnetic recording medium to record magnetic data on said magnetic recording medium.

23. The magnetic recording/reproducing apparatus of claim 22, wherein said electrode film has a crystal grain size of 20 nm or less.

24. The magnetic recording/reproducing apparatus of claim 22, wherein said magnetic head further includes a reproducing element.

25. A magnetic head comprising a slider and a recording element, wherein said recording element includes a non-magnetic film and a magnetic pole film and is supported by said slider, said non-magnetic film has a depression, said magnetic pole film includes an electrode film and a plated film, said electrode film is an amorphous film adhered to an inner surface of said depression, and said plated film is a film grown on said electrode film to have a crystal grain size $\alpha$; $0\ nm < \alpha \leqq 25\ nm$.

\* \* \* \* \*